(12) United States Patent
Koslov et al.

(10) Patent No.: US 7,532,683 B2
(45) Date of Patent: May 12, 2009

(54) UNIFIED RECEIVER FOR LAYERED AND HIERARCHICAL MODULATION SYSTEMS

(75) Inventors: Joshua Lawrence Koslov, Hopewell, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 624 days.

(21) Appl. No.: 10/556,544

(22) PCT Filed: Apr. 24, 2004

(86) PCT No.: PCT/US2004/013734

§ 371 (c)(1),
(2), (4) Date: Nov. 14, 2005

(87) PCT Pub. No.: WO2004/105302

PCT Pub. Date: Dec. 2, 2004

(65) Prior Publication Data

US 2007/0011716 A1    Jan. 11, 2007

Related U.S. Application Data

(60) Provisional application No. 60/471,167, filed on May 16, 2003.

(51) Int. Cl.
*H03K 9/00*    (2006.01)
(52) U.S. Cl. .................................... 375/316
(58) Field of Classification Search ............ 375/316
See application file for complete search history.

(56) References Cited

U.S. PATENT DOCUMENTS

| | | | |
|---|---|---|---|
| 4,039,961 A * | 8/1977 | Ishio et al. ................. 329/308 |
| 5,448,555 A | 9/1995 | Bremer et al. | |
| 5,646,935 A | 7/1997 | Ishikawa et al. | |
| 5,657,354 A * | 8/1997 | Thesling et al. ............ 375/332 |
| 5,966,412 A | 10/1999 | Ramaswamy | |
| 6,256,511 B1 | 7/2001 | Nisbet et al. | |
| 6,400,928 B1 * | 6/2002 | Khullar et al. ........... 455/67.11 |
| 6,574,235 B1 * | 6/2003 | Arslan et al. ............... 370/464 |
| 6,763,074 B1 * | 7/2004 | Yang ......................... 375/328 |
| 7,173,981 B1 * | 2/2007 | Chen et al. ................. 375/322 |
| 7,245,671 B1 * | 7/2007 | Chen et al. ................. 375/316 |
| 7,376,209 B2 * | 5/2008 | Namgoong et al. ......... 375/341 |
| 2002/0136329 A1 | 9/2002 | Jaffe et al. | |
| 2002/0181604 A1 * | 12/2002 | Chen .......................... 375/279 |

(Continued)

FOREIGN PATENT DOCUMENTS

EP    0969640 A    1/2000

(Continued)

OTHER PUBLICATIONS

Int'l Search Report.

(Continued)

*Primary Examiner*—Juan A Torres
(74) *Attorney, Agent, or Firm*—Robert D. Shedd; Joseph J. Opalach

(57) ABSTRACT

A satellite receiver includes a down converter for providing a received signal and a demodulator having at least two demodulation modes for demodulating the received signal, wherein one demodulation mode is hierarchical demodulation and another demodulation mode is layered demodulation.

14 Claims, 25 Drawing Sheets

U.S. PATENT DOCUMENTS

| | | | |
|---|---|---|---|
| 2004/0022335 A1* | 2/2004 | Arslan et al. | 375/346 |
| 2004/0184521 A1* | 9/2004 | Chen et al. | 375/231 |
| 2005/0084040 A1* | 4/2005 | Stewart et al. | 375/324 |
| 2005/0084043 A1* | 4/2005 | Yang et al. | 375/346 |
| 2005/0232174 A1* | 10/2005 | Onggosanusi et al. | 370/286 |
| 2005/0254600 A1* | 11/2005 | Chen et al. | 375/324 |
| 2006/0056541 A1* | 3/2006 | Chen et al. | 375/316 |

FOREIGN PATENT DOCUMENTS

| | | | |
|---|---|---|---|
| FR | 2746989 A | 10/1997 | |
| WO | WO 01/39453 A1 | 5/2001 | |
| WO | WO 01/39456 A | 5/2001 | |
| WO | WO 02/089371 | 11/2002 | |

OTHER PUBLICATIONS

Kannan Ramchandran: "Multiresolution Broadcast for Digital HDTV Using Joint Source/Channel Coding" IEEE Journal on Selected Areas In Communications, IEEE Inc. New York, US, vol. 11, No. 1, 1993, pp. 6-22, XP000377993 ISSN: 0733-8716 p. 10, left hand column, lasat paragraph figure 7.

* cited by examiner

US 7,532,683 B2

UNIFIED RECEIVER FOR LAYERED AND HIERARCHICAL MODULATION SYSTEMS

This application claims the benefit, under 35 U.S.C. § 365 of International Application PCT/US04/013734, filed Apr. 24, 2004, which was published in accordance with PCT Article 21(2) on Dec. 2, 2004 in English and which claims the benefit of United States provisional patent application No. 60/471,167, filed May 16, 2003.

BACKGROUND OF THE INVENTION

The present invention generally relates to communications systems and, more particularly, to satellite-based communications systems.

As described in U.S. Pat. No. 5,966,412 issued Oct. 12, 1999 to Ramaswamy, hierarchical modulation can be used in a satellite system as a way to continue to support existing legacy receivers yet also provide a growth path for offering new services. In other words, a backward-compatible hierarchical modulation based satellite system permits additional features, or services, to be added to the system without requiring existing users to buy new satellite receivers. In a hierarchical modulation based communications system, at least two signals, e.g., an upper layer (UL) signal and a lower layer (LL) signal, are added together to generate a synchronously modulated satellite signal for transmission. In the context of a satellite-based communications system that provides backward compatibility, the LL signal provides additional services, while the UL signal provides the legacy services, i.e., the UL signal is, in effect, the same signal that was transmitted before—thus, the satellite transmission signal can continue to evolve with no impact to users with legacy receivers. As such, a user who already has a legacy receiver can continue to use the legacy receiver until such time that the user decides to upgrade to a receiver, or box, that can recover the LL signal to provide the additional services.

In a similar vein, a layered modulation based communication system can also be used to provide an approach that is backward compatible. In a layered modulation based system at least two signals are modulated (again, e.g., a UL signal (legacy services) and an LL signal (additional services)) onto the same carrier (possibly asynchronously with each other). Transmission of the UL signal and the LL signal occur separately via two transponders and the front end of a layered modulation receiver combines them before recovery of the data transported therein.

SUMMARY OF THE INVENTION

We have observed that a receiver designed to receive and demodulate hierarchical modulation based signals cannot receive and demodulate layered modulation based signals and vice versa. Thus, separate receivers must be designed and inventoried for each respective modulation system. Therefore, and in accordance with the principles of the invention, a receiver includes a down converter for providing a received signal and a demodulator having at least two demodulation modes for demodulating the received signal, wherein one demodulation mode is a hierarchical demodulation mode and another demodulation mode is a layered demodulation mode.

In an embodiment of the invention, a satellite communications system comprises a transmitter, a satellite transponder and a receiver. The transmitter transmits an uplink multi-level modulated signal (hierarchical modulation or layered modulation) to the satellite transponder, which broadcasts the multi-level modulated signal downlink to one, or more, receivers. At least one receiver is capable of operating in any one of a number of demodulation modes for processing a received signal. In particular, the receiver selects a demodulation process to perform as a function of the demodulation mode, wherein at least two of the number of demodulation modes are a hierarchical demodulation mode and a layered demodulation mode; and the receiver then demodulates the received signal in accordance with the selected demodulation mode.

DETAILED DESCRIPTION

Other than the inventive concept, the elements shown in the figures are well known and will not be described in detail. Also, familiarity with satellite-based systems is assumed and is not described in detail herein. For example, other than the inventive concept, satellite transponders, downlink signals, symbol constellations, a radio-frequency (rf) front-end, or receiver section, such as a low noise block downconverter, formatting and encoding methods (such as Moving Picture Expert Group (MPEG)-2 Systems Standard (ISO/IEC 13818-1)) for generating transport bit streams and decoding methods such as log-likelihood ratios, soft-input-soft-output (SISO) decoders, Viterbi decoders are well-known and not described herein. In addition, the inventive concept may be implemented using conventional programming techniques, which, as such, will not be described herein. Finally, like-numbers on the figures represent similar elements.

Figure 1:
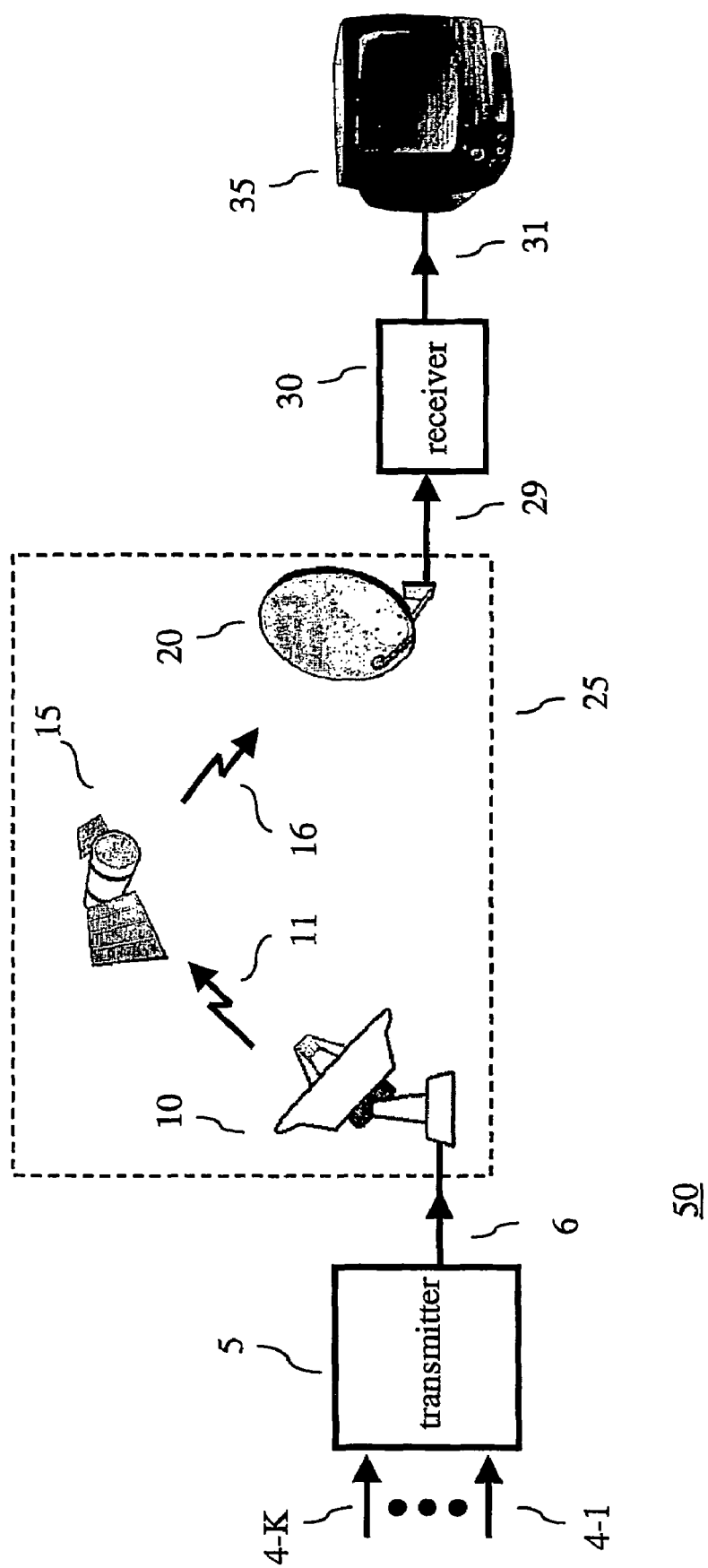
FIG. 1 shows an illustrative satellite communications system embodying the principles of the invention.
Figure 2:
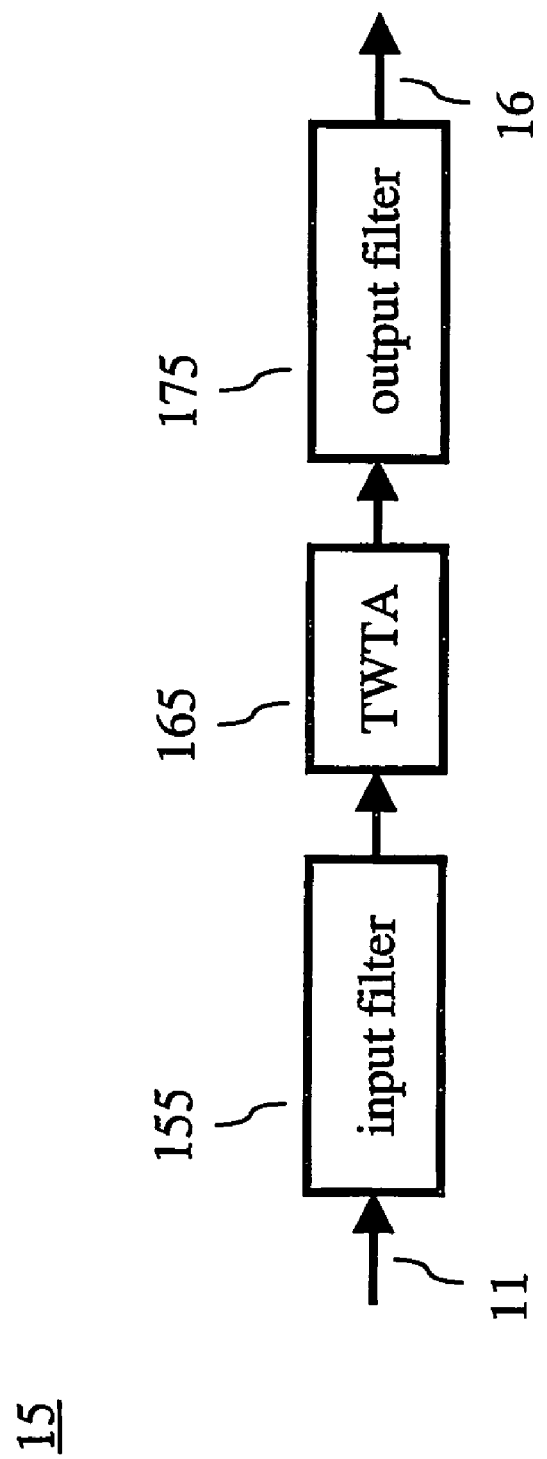
FIG. 2 shows an illustrative block diagram of a transmission path through satellite 15 of FIG. 1.

An illustrative communications system 50 in accordance with the principles of the invention is shown in FIG. 1. Communications system 50 includes transmitter 5, satellite channel 25, receiver 30 and television (TV) 35. Although described in more detail below, the following is a brief overview of communications system 50. Transmitter 5 receives a number of data streams as represented by signals 4-1 through 4-K and provides a multi-level modulated signal 6 to satellite transmission channel 25. Illustratively, these data streams represent control signaling, content (e.g., video), etc., of a satellite TV system and may be independent of each other or related to each other, or a combination thereof. The multi-level modulated signal 6 represents either a hierarchical modulation based signal or a layered modulation based signal having K layers, where K≧2. It should be noted that the words "layer" and "level" are used interchangeably herein. Satellite channel 25 includes a transmitting antenna 10, a satellite 15 and a receiving antenna 20. Transmitting antenna 10 (representative of a ground transmitting station) provides multi-level modulated signal 6 as uplink signal 11 to satellite 15. Referring briefly to FIG. 2, an illustrative block diagram of the transmission path through satellite 15 for a signal is shown. Satellite 15 includes an input filter 155, a traveling wave tube amplifier (TWTA) 165 and an output filter 175. The uplink signal 11 is first filtered by input filter 155, then amplified for retransmission by TWTA 165. The output signal from TWTA 165 is then filtered by output filter 175 to provide downlink signal 16 (which is typically at a different frequency than the uplink signal). As such, satellite 15 provides for retransmission of the received uplink signal via downlink signal 16 to a broadcast area. This broadcast area typically covers a predefined geographical region, e.g., a portion of the continental United States. Turning back to FIG. 1, downlink signal 16 is received by receiving antenna 20, which provides a received signal 29 to receiver 30, which demodulates and decodes received signal 29 in accordance with the principles of the invention to provide, e.g., content to TV 35, via signal 31, for viewing thereon. It should be noted that although not described herein, transmitter 5 may further predistort the signal before transmission to compensate for non-linearities in the channel.

Figure 3:
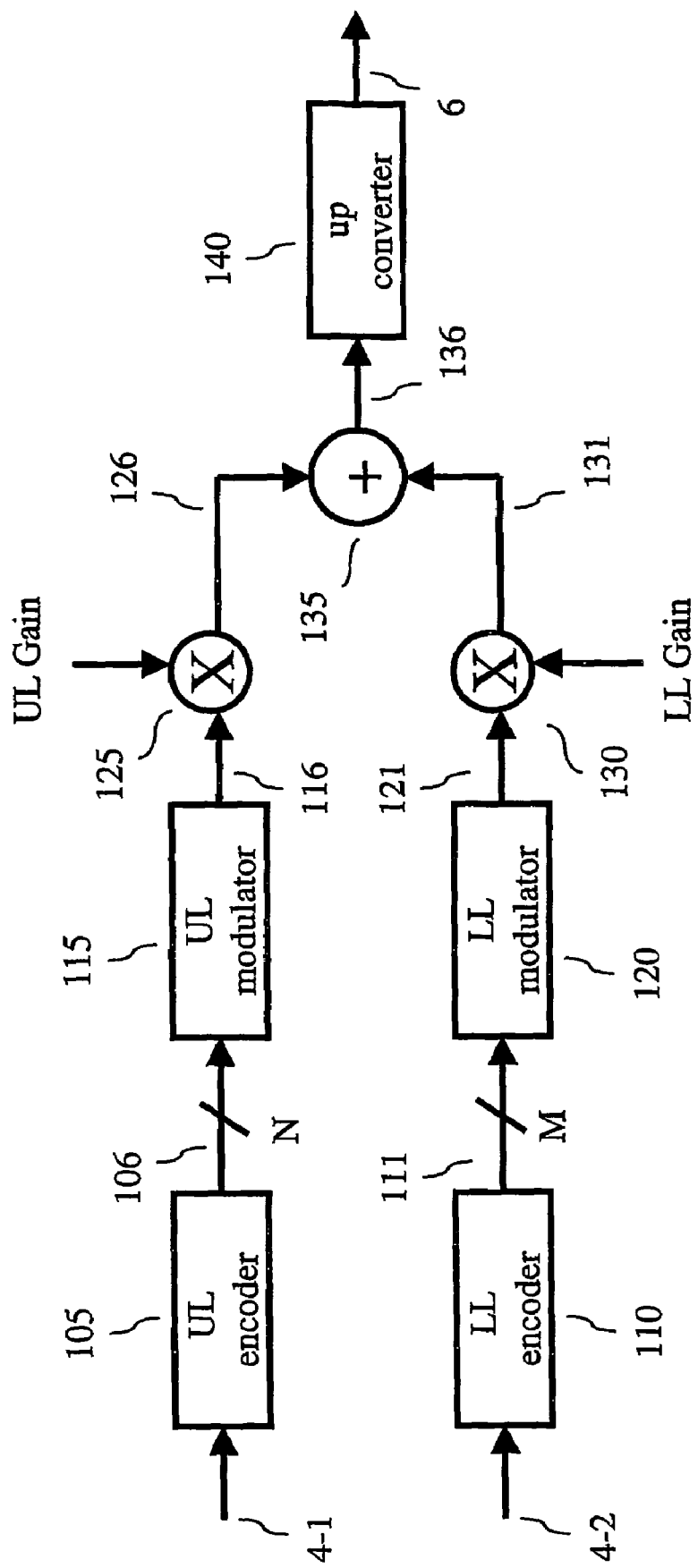
FIG. 3 shows an illustrative embodiment for implementing hierarchical modulation in transmitter 5 of FIG. 1.
Figure 7:
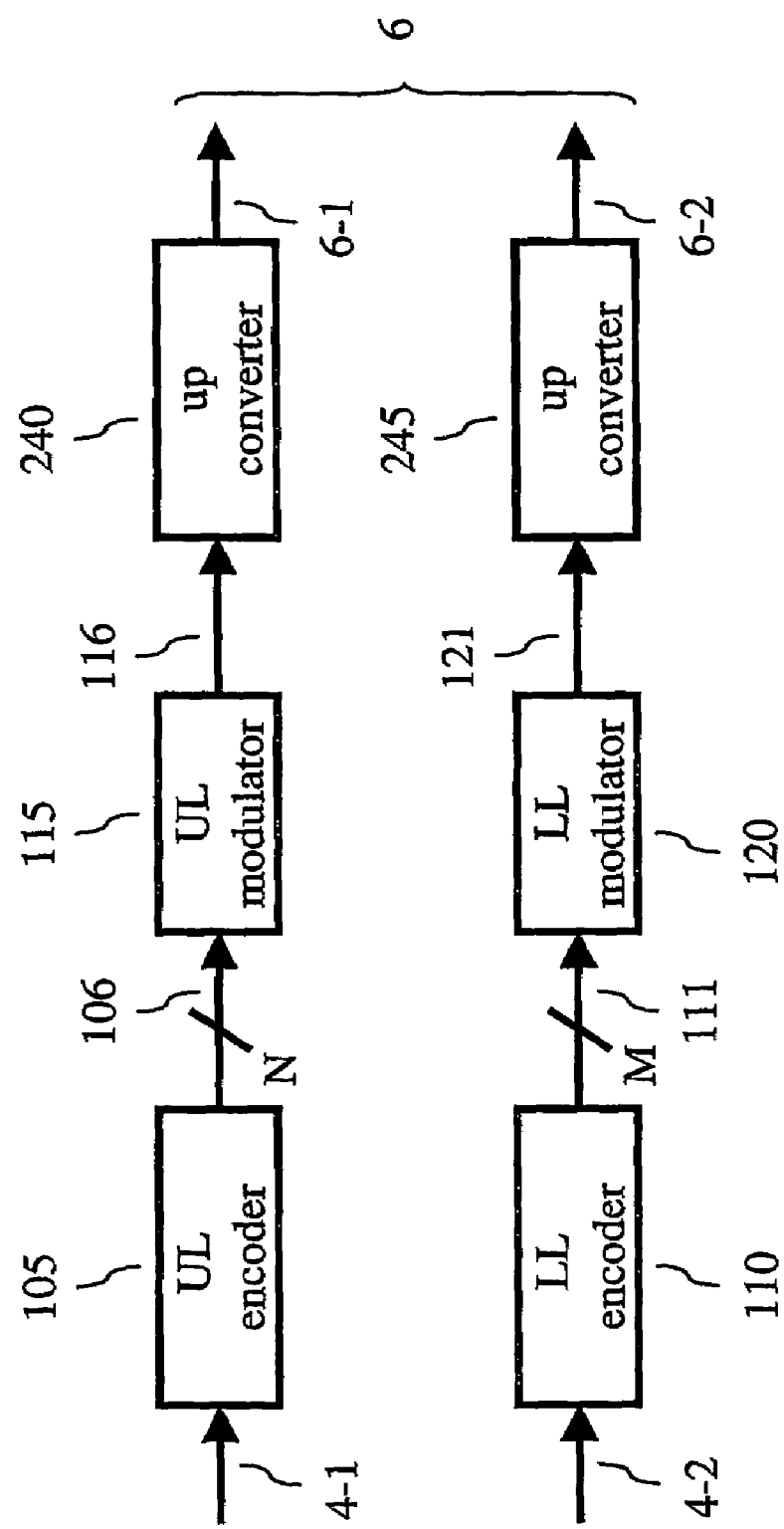
FIG. 7 shows an illustrative layered modulation embodiment for use in transmitter 5 of FIG. 1.

As noted above, in the context of this description multi-level modulated signal 6 represents either a hierarchical modulation based signal or a layered modulation based signal. In the case of the former, an illustrative block diagram for transmitter 5 is shown in FIG. 3; while in the latter case an illustrative block diagram for transmitter 5 is shown in FIG. 7. In the remainder of this description it is illustratively assumed that there are two data streams, i.e., K=2. It should be noted that the invention is not limited to K=2 and, in fact, a particular data stream such as signal 4-1 may already represent an aggregation of other data streams (not shown).

Turning first to FIG. 3, an illustrative hierarchical modulation transmitter for use in transmitter 5 is shown. Hierarchical modulation is simply described as a synchronous modulation system where a lower layer signal is synchronously embedded into an upper layer signal so as to create a higher order modulation alphabet.

In FIG. 3, the hierarchical modulation transmitter comprises UL encoder 105, UL modulator 115, LL encoder 110, LL modulator 120, multipliers (or amplifiers) 125 and 130, combiner (or adder) 135 and up converter 140. The upper layer (UL) path is represented by UL encoder 105, UL modulator 115 and amplifier 125; while the lower layer (LL) path is represented by LL encoder 110, LL modulator 120 and amplifier 130. As used herein, the term "UL signal" refers to any signal in the UL path and will be apparent from the context. For example, in the context of FIG. 3, this is one or more of the signals 4-1, 106, 116 and 126. Similarly, the term "LL signal" refers to any signal in the LL path. Again, in the context of FIG. 3, this is one of more of the signals 4-2, 111, 121 and 131. Further, each of the encoders implement known error detection/correction codes (e.g., convolutional or trellis codes; concatenated forward error correction (FEC) scheme, where a rate ½, ⅔, ⅘ or ⅚code; LDPC codes (low density parity check codes); etc.). For example, typically UL encoder 105 uses a convolutional code or a short block code; while LL encoder 110 uses a turbo code or LDPC code. For the purposes of this description it is assumed that LL encoder 110 uses an LDPC code. In addition, a convolutional interleaver (not shown) may also be used.

Figure 4:
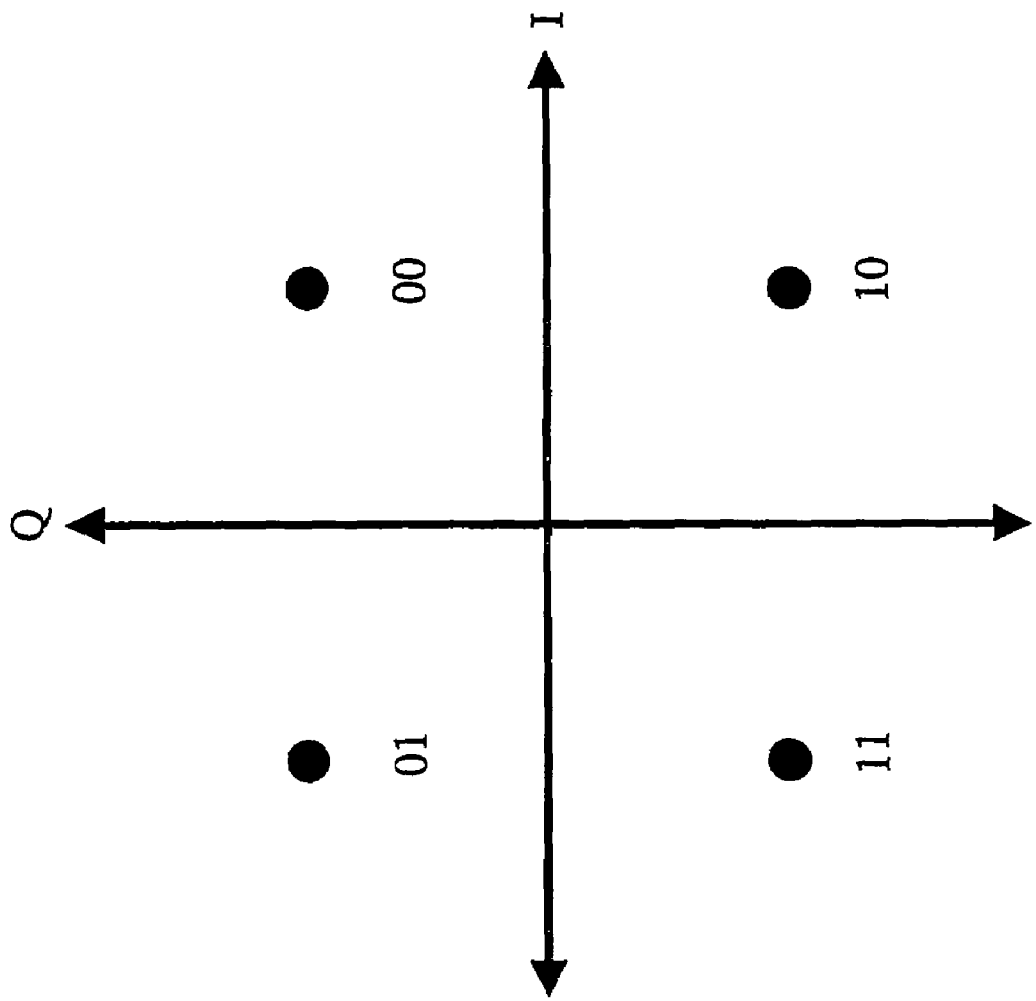
FIG. 4 shows an illustrative symbol constellation for use in the upper layer and the lower layer.

As can be observed from FIG. 3, signal 4-2 is applied to LL encoder 110, which provides an encoded signal 111 to LL modulator 120. Likewise, signal 4-1 is applied to UL encoder 105, which provides an encoded signal 106 to UL modulator 115. Encoded signal 106 represents N bits per symbol interval T; while encoded signal 111 represents M bits per symbol interval T, where N may, or may not, equal M. Modulators 115 and 120 modulate their respective encoded signals to provide modulated signals 116 and 121, respectively. It should be noted that since there are two modulators, 115 and 120, the modulation can be different in the UL path and the LL path. Again, for the purposes of this description it is assumed that the number of UL encoded data bits is two, i.e., N=2, and that UL modulator 115 generates a modulated signal 116 that lies in one of four quadrants of a signal space. That is, UL modulator 115 maps two encoded data bits to one of four symbols. Similarly, the number of LL encoded data bits is also assumed to be two, i.e., M=2, and LL modulator 120 also generates a modulated signal 121 that lies in one of four quadrants of the signal space. An illustrative symbol constellation 89 for use in both the UL and the LL is shown in FIG. 4. It should be noted that signal space 89 is merely illustrative and that symbol constellations of other sizes and shapes can be used.

Figure 5:
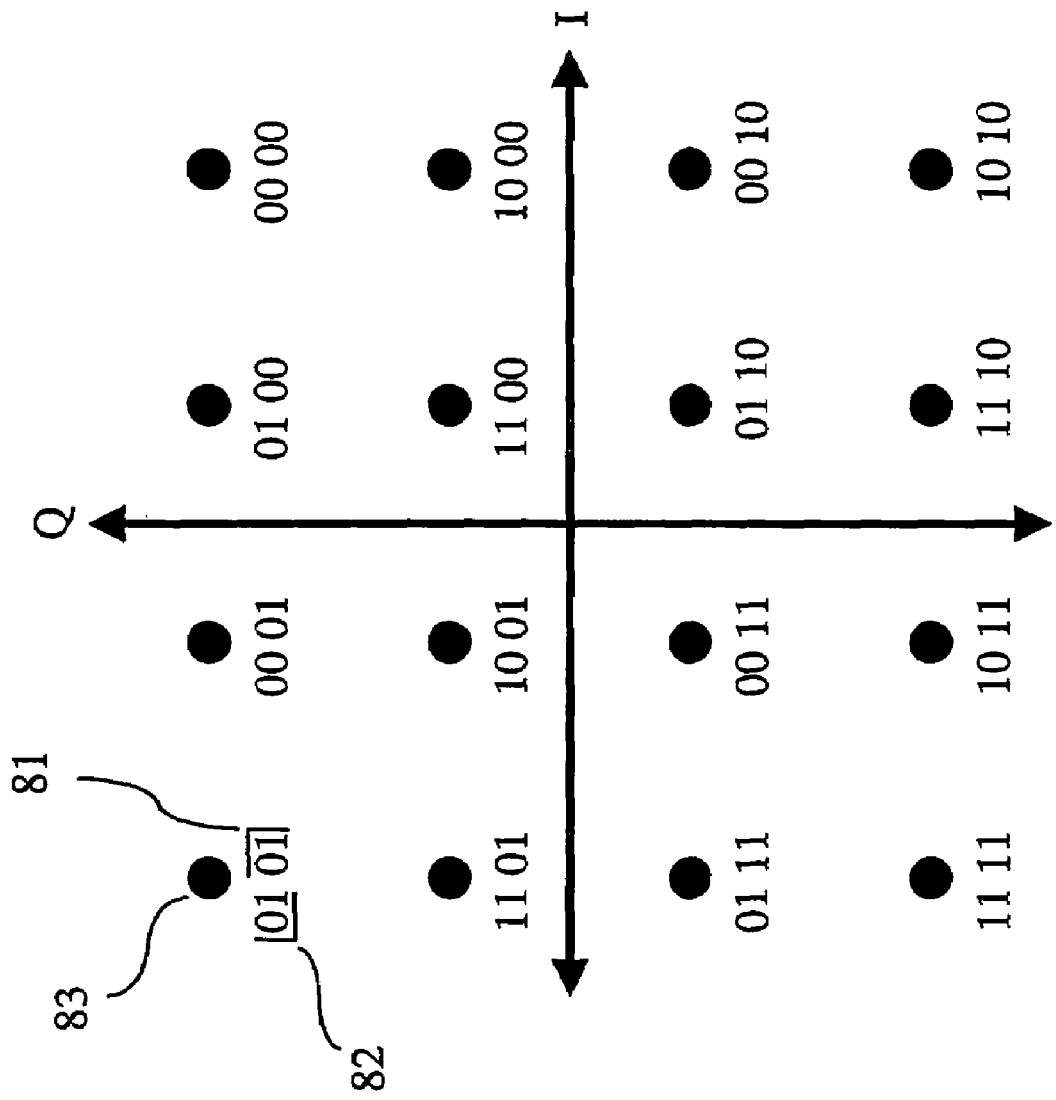
FIG. 5 shows an illustrative resulting symbol constellation for a multi-level signal.

However, the output signals from UL modulator 115 and LL modulator 120 are further adjusted in amplitude by a predefined UL gain and a predefined LL gain via amplifiers 125 and 130, respectively. It should be noted that the gains of the lower and upper layer signals determine the ultimate placement of the points in the signal space. For example, the UL gain may be set to unity, i.e., 1, while the LL gain may be set to 0.5. The UL signal and the LL signal are then combined via combiner, or adder, 135, which provides combined signal 136. Thus, the modulator of FIG. 3, e.g., the amplifiers 125 and 130, along with combiner 135, effectively further rearranges and partitions the signal space such that the UL signal specifies one of the four quadrants of the signal space; while the LL signal specifies one of a number of subquadrants of a particular quadrant of the signal space as illustrated in FIG. 5 by signal space 79.

Figure 6:
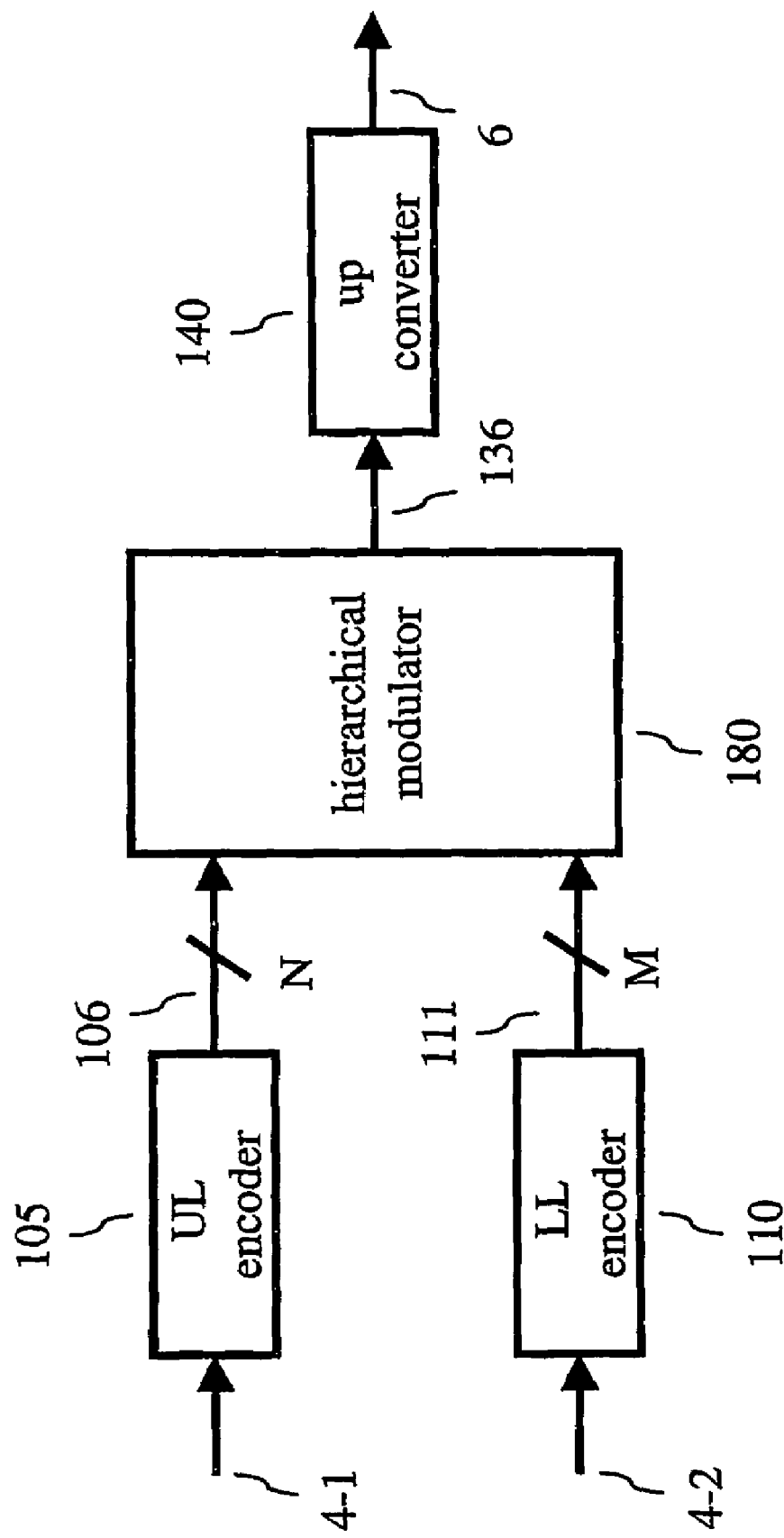
FIG. 6 shows another illustrative embodiment for implementing hierarchical modulation in transmitter 5 of FIG. 1.

In effect, the resulting signal space 79, also referred to herein as the combined signal space 79, comprises 16 symbols, each symbol located at a particular signal point in the signal space and associated with a particular four bits. For example, symbol 83 is associated with the four bit sequence "01 01". The lower two bit portion 81 is associated with the UL and specifies a quadrant of signal space 79; while the upper two bit portion 82 is associated with the LL and specifies a subquadrant of the quadrant specified by two bit portion 81. It should be noted that since the UL signal identifies the quadrant, the LL signal effectively looks like noise on the UL signal. In this regard, combined signal space 79 is representative of the concept and the distances between symbols therein is not to scale. Returning to FIG. 3, the combined signal 136 is applied to up converter 140, which provides multi-level modulated signal 6 at the appropriate transmission frequency. Turning briefly to FIG. 6, another illustrative embodiment for implementing hierarchical modulation in transmitter 5 is shown. FIG. 6 is similar to FIG. 3 except that hierarchical modulator 180 performs the mapping of the lower layer and upper layer bits into the combined signal space. For example, the upper layer may be a QPSK (quadrature phase-shift keying) signal space, while the lower layer is a BPSK (binary phase-shift keying) signal space: in this case, the resulting combined signal space would be, e.g., a non-uniform 8-PSK signal.

Turning now to FIG. 7, an illustrative block diagram of a layered modulator for use in transmitter 5 of FIG. 1 is shown. Here, while the elements of transmitter 5 are similar to those described above for FIG. 3, transmitter 5 comprises two separate transmitter paths. The upper layer path includes UL encoder 105, UL modulator 115 and up converter 240. The lower layer path includes LL encoder 110, LL modulator 120 and up converter 245. Signal 4-1 is encoded by UL encoder 105 to provide encoded signal 106 representing N bits every upper layer symbol interval, $T_{UL}$, and signal 4-2 is encoded by LL encoder 110 to provide encoded signal 111 representing M bits every lower layer symbol interval, $T_{LL}$, where M may, or may not, be equal to N. The UL encoded signal 106 is then modulated by UL modulator 115 to provide UL modulated signal 116, which is then upconverted to the appropriate frequency band by up converter 240, which provides UL signal 6-1. Similarly, LL encoded signal 111 is modulated by LL modulator 120 to provide LL modulated signal 121, which is then upconverted by up converter 245 to provide LL signal 6-2. It should be observed from FIG. 7 that transmitter 5 transmits two signals, i.e., multi-level modulated signal 6 comprises UL signal 6-1 and LL signal 6-2. Typically, LL signal 6-2 is transmitted at a lower power level than UL signal 6-1. In fact, a layered modulation scheme typically requires careful power control between the upper layer path and the lower layer path so that the recovery at the receiver occurs in a meaningful manner.

Figure 8:
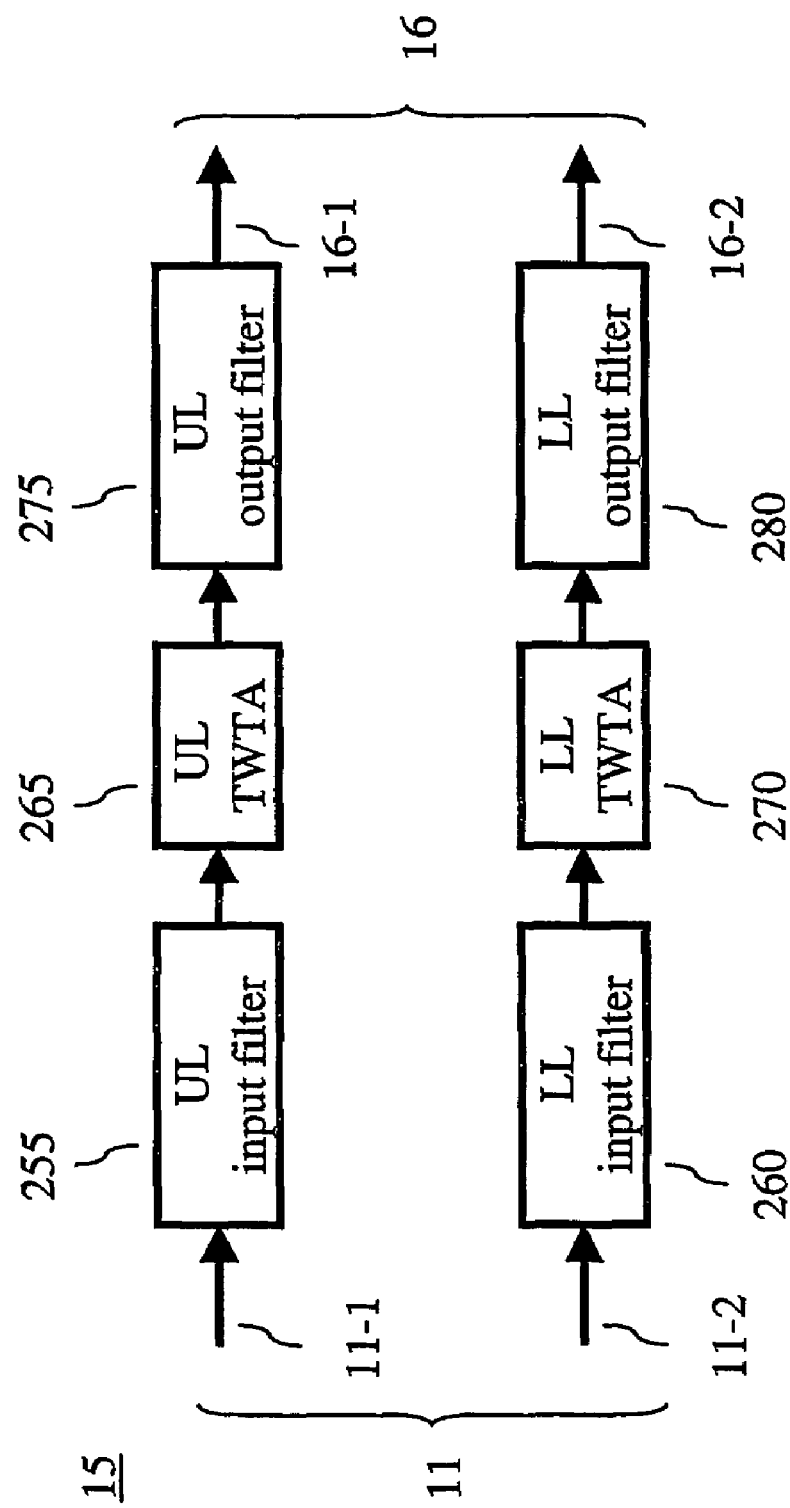
FIG. 8 shows an illustrative block diagram of a satellite transmission path in the context of a layered modulation based system.

As such, and referring now to FIG. 8, for a layered modulation based system uplink signal 11 represents two uplink signals: UL uplink signal 11-1 and LL uplink signal 11-2; while downlink signal 16 represents two downlink signals: LL downlink signal 16-2 and UL downlink signal 16-1. In this example, satellite 15 of FIG. 1 may be a single satellite with two different transponders (one for the UL signal and the other for the LL signal) or two different satellites. Whether one satellite or two, as shown in FIG. 8 there are, in effect, two satellite transmission paths. The UL satellite path includes UL input filter 255, UL TWTA 265 and UL output filter 275, which provides UL downlink signal 16-1; while the LL satellite path includes LL input filter 260, LL TWTA 270 and LL output filter 280, which provides LL downlink signal 16-2. Each of the elements of FIG. 8 function in a similar fashion to the respective elements shown in FIG. 2 and described earlier.

Figure 9:
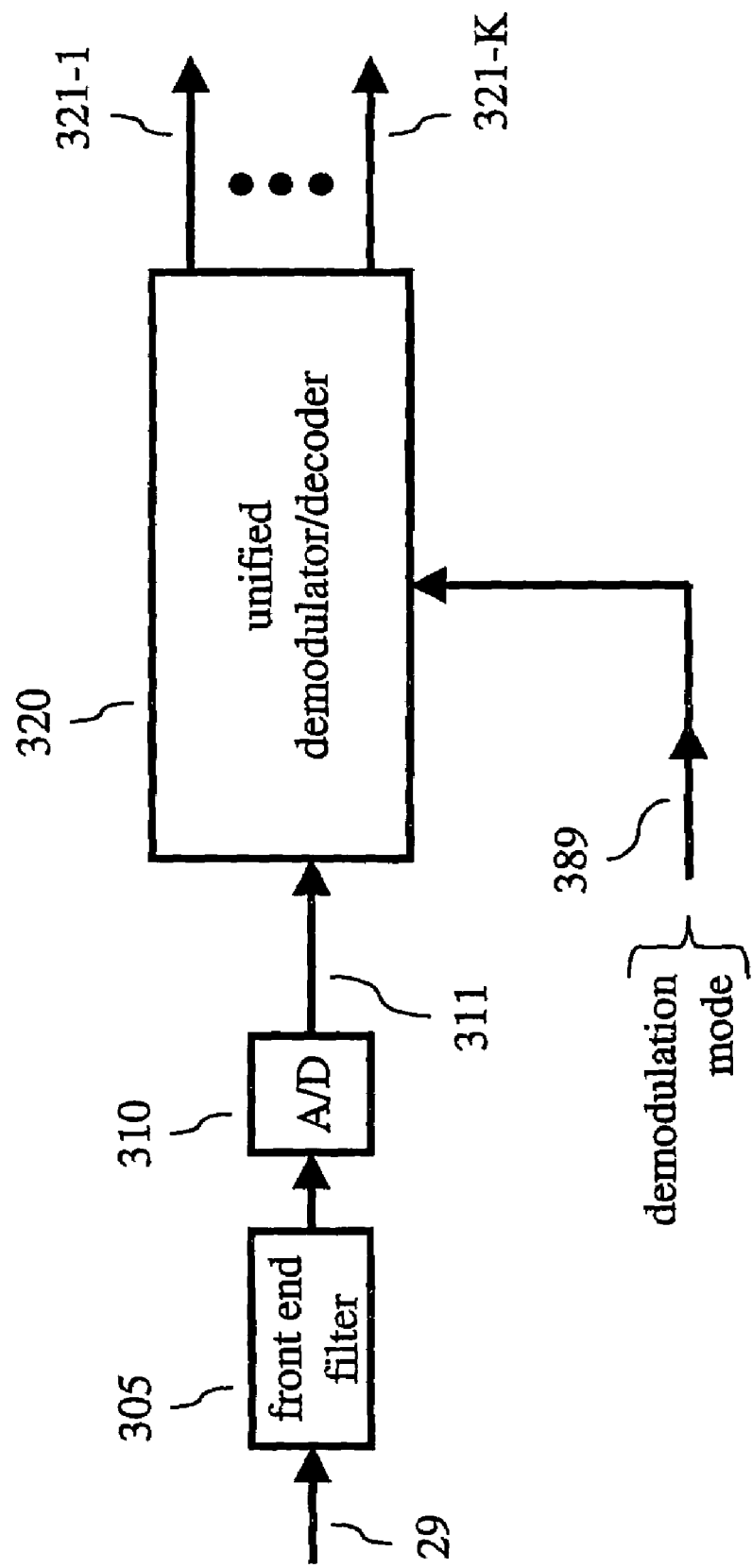
FIG. 9 shows an illustrative block diagram of a receiver in accordance with the principles of the invention.

As noted above, after reception of the downlink signal 16 by receiving antenna 20, receiver 30 demodulates and decodes received signal 29 to provide, e.g., content to TV 35 for viewing thereon. An illustrative portion of receiver 30 in accordance with the principles of the invention is shown in FIG. 9. Receiver 30 includes front end filter 305, analog-to-digital converter 310 and unified demodulator/decoder 320. Front end filter 305 down-converts and filters received signal 29 to provide a near base-band signal to A/D 310, which samples the down converted signal to convert the signal to the digital domain and provide a sequence of samples 311 (also referred to as multi-level signal 311) to unified demodulator/decoder 320. The latter, in accordance with the principles of the invention, has a number of demodulation modes, where at least two of the demodulation modes represent a hierarchical demodulation mode and a layered demodulation mode. The selection of a particular demodulation mode is provided by demodulation mode signal 389, which is illustratively set a priori. Demodulation mode signal 389 can be set in any one of a number of ways, e.g., a jumper setting, configuration information (not shown) of receiver 30 that may be viewable, e.g., on TV set 35, and settable, e.g., via a remote control (not shown), or from data transmitted on an out-of-band or an in-band signaling channel. If set in the hierarchical demodulation mode, unified demodulator/decoder 320 performs hierarchical demodulation of multi-level signal 311 and provides a number of output signals, 321-1 to 321-K, representative of data conveyed by multi-level signal 311 on the K layers. Data from one or more of these output signals are provided to TV set 35 via signal 31. (In this regard, receiver 30 may additionally process the data before application to TV set 35 and/or directly provide the data to TV set 35.) In the following example the number of levels is two, i.e., K=2, but the inventive concept is not so limited. For example, in the hierarchical demodulation mode, unified demodulator/decoder 320 provides UL signal 321-1 and LL signal 321-2. The former ideally represents what was transmitted on the upper layer, i.e., signal 4-1 of FIG. 3; while the latter ideally represents what was transmitted on the lower layer, i.e., signal 4-2 of FIG. 3. Similarly, if set in the layered demodulation mode, unified demodulator/decoder 320 performs layered demodulation of multi-level signal 311 to provide UL signal 321-1 and LL signal 321-2, which ideally represents signals 4-1 and 4-2 of FIG. 7.

Figure 10:
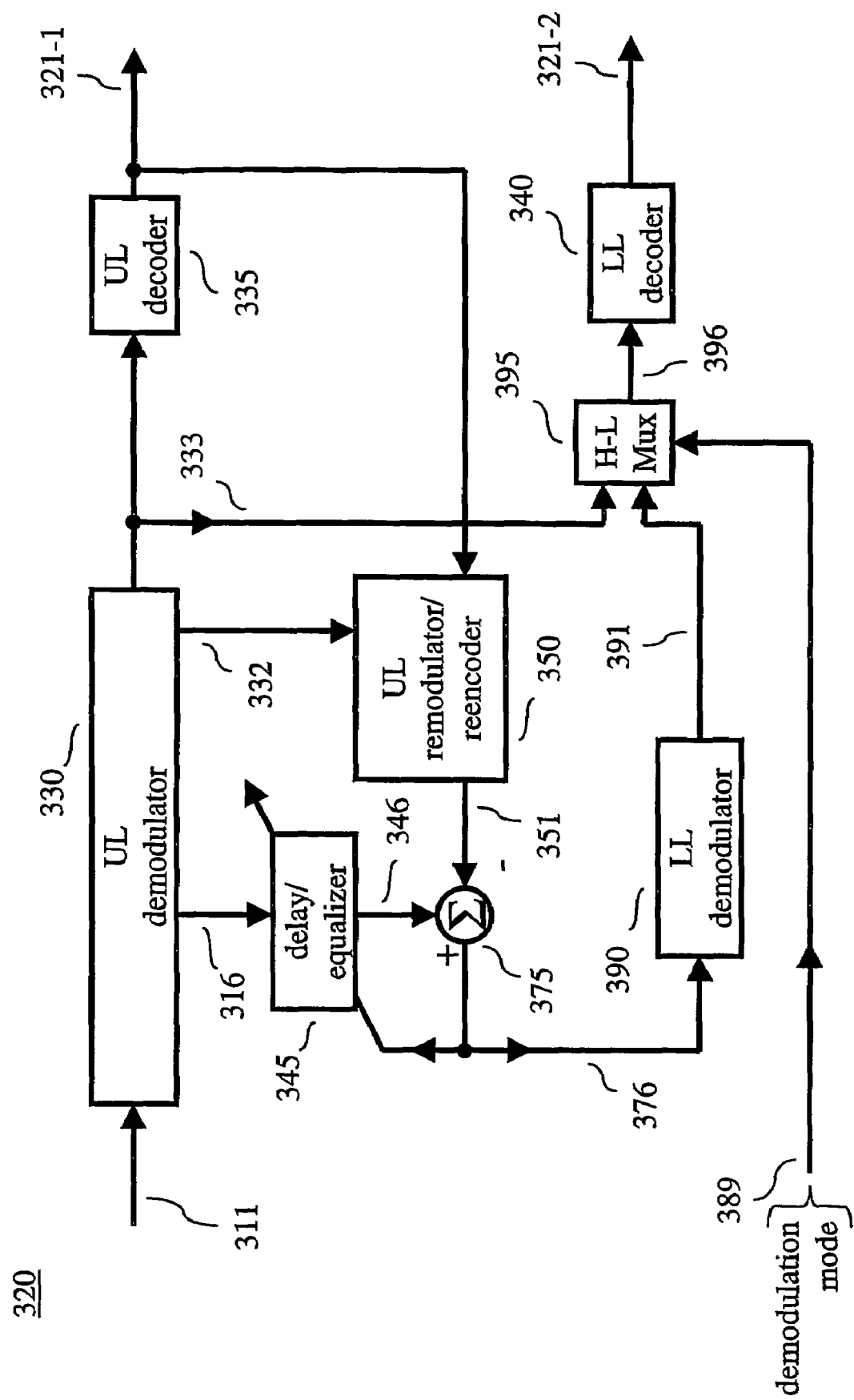
FIG. 10 shows an illustrative block diagram of unified demodulator/decoder 320 of FIG. 9 in accordance with the principles of the invention.
Figure 11:
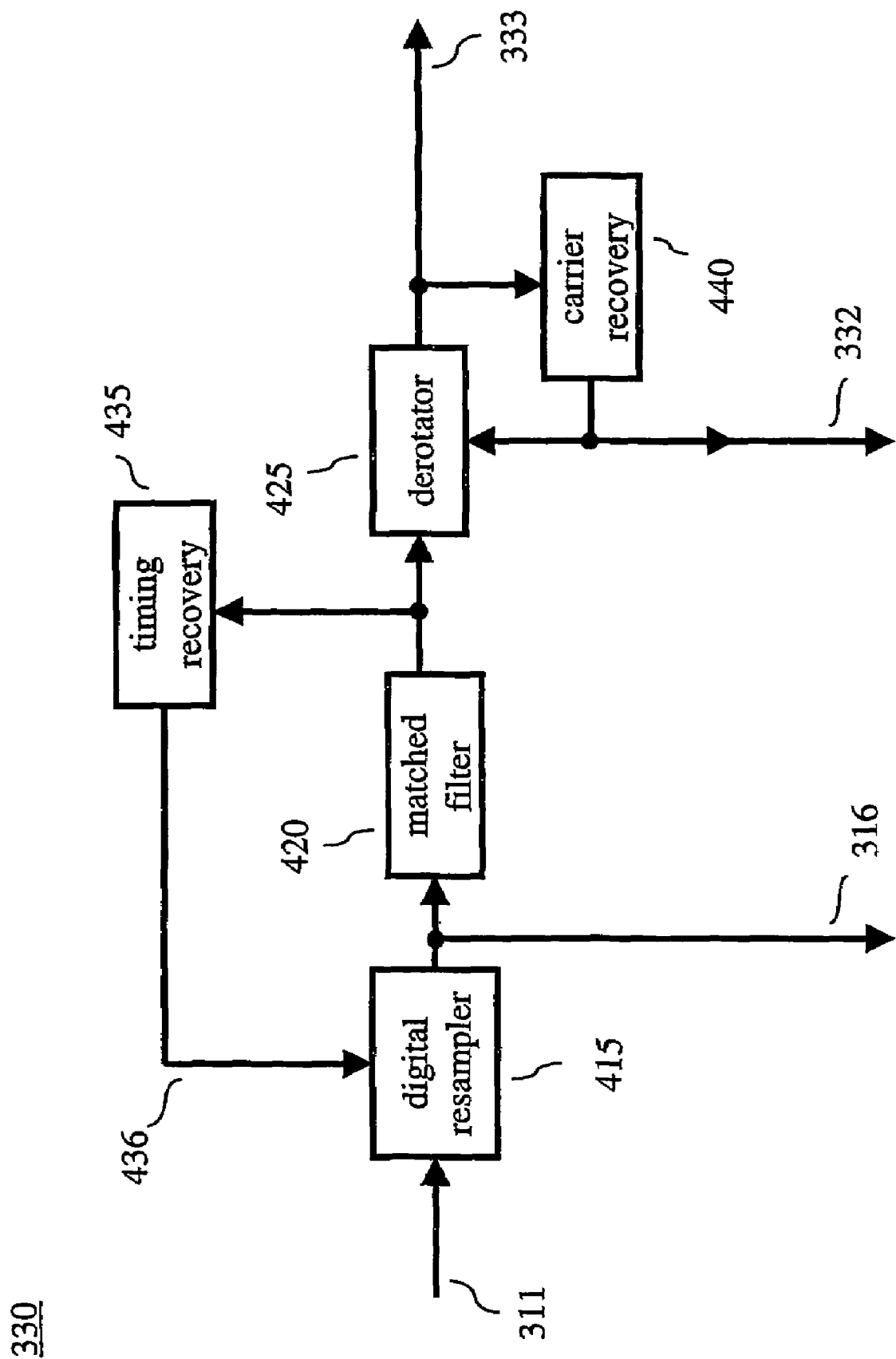
FIGS. 11-15 show various blocks diagrams of different portions of unified demodulator/decoder 320 in accordance with the principles of the invention.

Turning now to FIG. 10, an illustrative block diagram of unified demodulator/decoder 320 is shown. Unified demodulator/decoder 320 comprises UL demodulator 330, delay/equalizer element 345, UL decoder 335, UL remodulator/reencoder 350, combiner 375, LL demodulator 390, H-L multiplexer (H-L mux) 395 (also referred to herein as H-L selector 395) and LL decoder 340. Multi-level signal 311 is applied to UL demodulator 330, which demodulates this signal and provides therefrom a UL carrier signal 332, a resampled multi-level signal 316 and a demodulated UL signal as represented by demodulated UL signal point stream 333. Referring now to FIG. 11, an illustrative block diagram of UL demodulator 330 is shown. UL demodulator 330 includes digital resampler 415, matched filter 420, derotator 425, timing recovery element 435 and carrier recovery element 440. Multi-level signal 311 is applied to digital resampler 415, which resamples multi-level signal 311 using UL timing signal 436, which is provided by timing recovery element 435, to provide resampled multi-level signal 316. Resampled multi-level signal 316 is applied to matched filter 420 and is also provided to delay/equalizer element 345 (described below). Matched filter 420 is a band-pass filter for filtering resampled multi-level signal 316 about the UL carrier frequency to provide a filtered signal to both derotator 425 and the above-mentioned timing recovery element 435, which generates therefrom UL timing signal 436. Derotator 425 derotates, i.e., removes the carrier from the filtered signal to provide a demodulated UL signal point stream 333. Carrier recover element 440 uses the demodulated UL signal point stream 333 to recover therefrom UL carrier signal 332, which is applied to derotator 425 and to UL remodulator/reencoder 350 (described below).

Referring back to FIG. 10, UL decoder 335 acts in a complementary fashion to corresponding UL encoder 105 of transmitter 5 and decodes the demodulated UL signal point stream 333 to provide UL signal 321-1. As noted above, UL signal 321-1 represents the data conveyed on the upper layer, e.g., as represented by signal 4-1 of FIGS. 3 and 7. It should be observed that UL decoder 321-1 recovers the data conveyed in the UL by, in effect, treating the LL signal as noise on the UL signal. In other words, UL decoder 335 operates as if UL signal 321-1 represents symbols selected from signal space 89 of FIG. 4. As an alternative to rerotating the reconstructed signal for subtraction, the combined signal can be derotated for subtraction.

Figure 12:
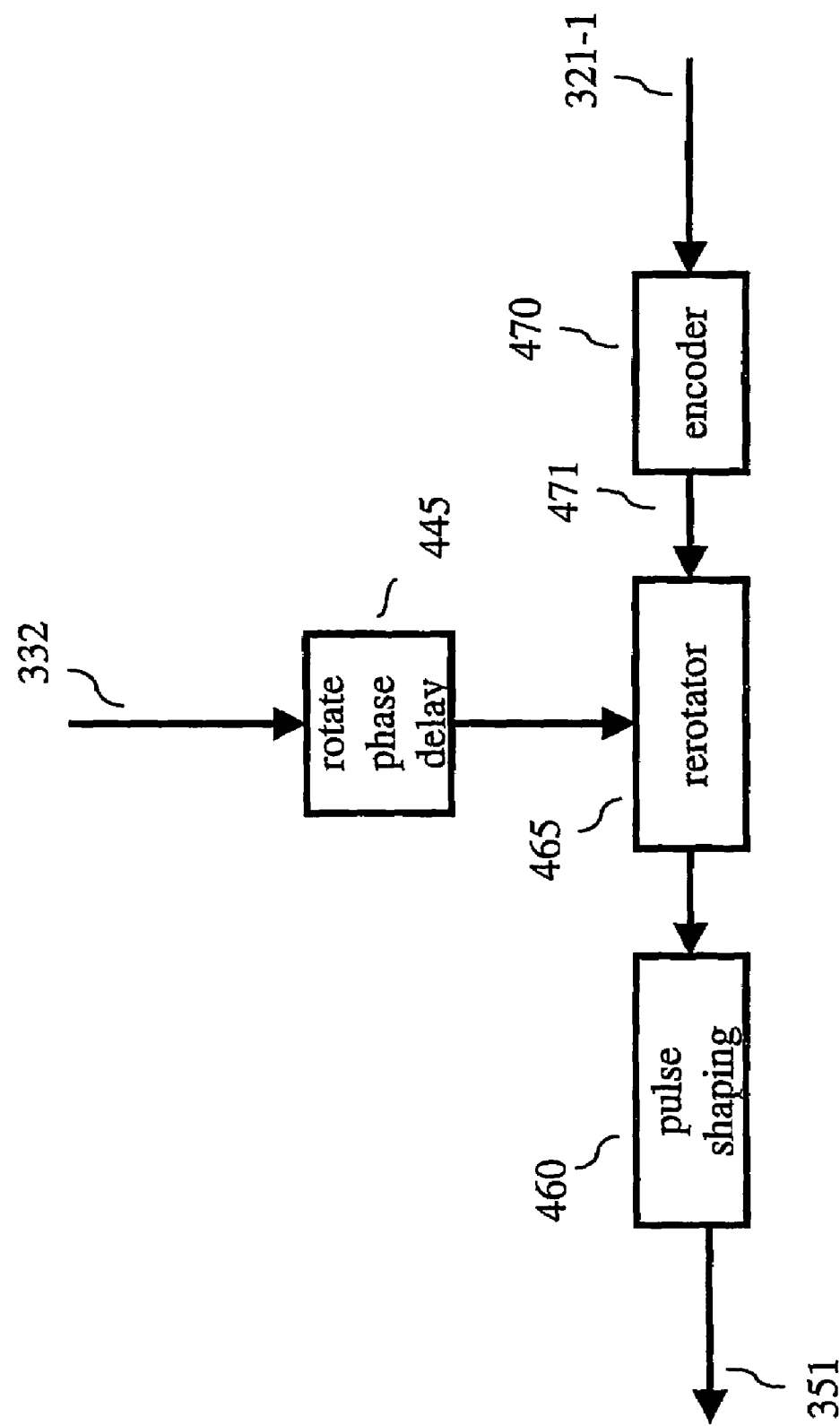

UL signal 321-1 is also applied to remodulator/reencoder 350, which, responsive to UL carrier signal 332, locally reconstructs the UL modulated signal. In particular, remodulator/reencoder 350 reencodes and then remodulates UL signal 321-1 to provide UL modulated signal 351 to a negative input terminal of combiner 375. Referring briefly to FIG. 12, a block diagram of an illustrative remodulator/reencoder 350 is shown. Remodulator/reencoder 350 includes rotate phase delay element 445, encoder 470, rerotator 465 and pulse shaping element 460. Encoder 470 reencodes and maps UL signal 321-1 to provide an encoded symbol stream 471 to rerotator 465, which re-rotates encoded symbol stream 471 by a delayed version of the locally generated UL carrier frequency, as determined by the upper layer carrier recovery element 440. The output signal from rerotator 465 is applied to pulse shaping element 460, which further shapes the reconstructed signal to provide UL modulated signal 351.

Figure 13:
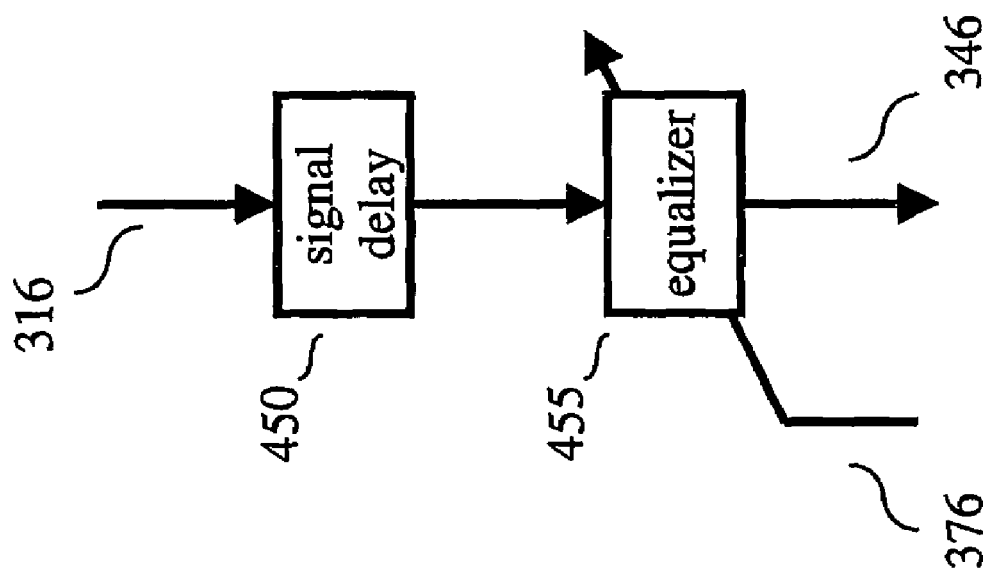

Turning back to FIG. 10, combiner 375 subtracts UL modulated signal 351 from a delayed and equalized version (signal 346) of resampled multi-level signal 316 to provide a signal representative of just the received LL modulated signal, i.e., LL modulated signal 376, which is also used to update taps (not shown) of the equalizer of delay/equalizer element 345. The two input signals to the combiner 375 are at the same sampling rate, typically an integer multiple of the upper layer symbol rate. An illustrative block diagram of delay/equalizer element 345 is shown in FIG. 13. Delay/equalizer element 345 includes signal delay element 450 and equalizer 455. Signal delay element 450 compensates for the delay in the signal processing path through UL demodulator 330, decoder 335 and remodulator/reencoder 350; while equalizer 455 attempts to remove linear distortions, such as tilts on the signal path in the tuner, such that combiner 375, in effect, cancels as much of the UL signal as possible from the resampled multi-level signal 316 to provide a clean LL modulated signal 376. In other words, equalization is performed to optimally match the UL component of resampled multi-level signal 316 to locally reconstructed UL modulated signal 351 so as to optimally remove the UL signal before demodulating and decoding the LL signal.

Figure 14:
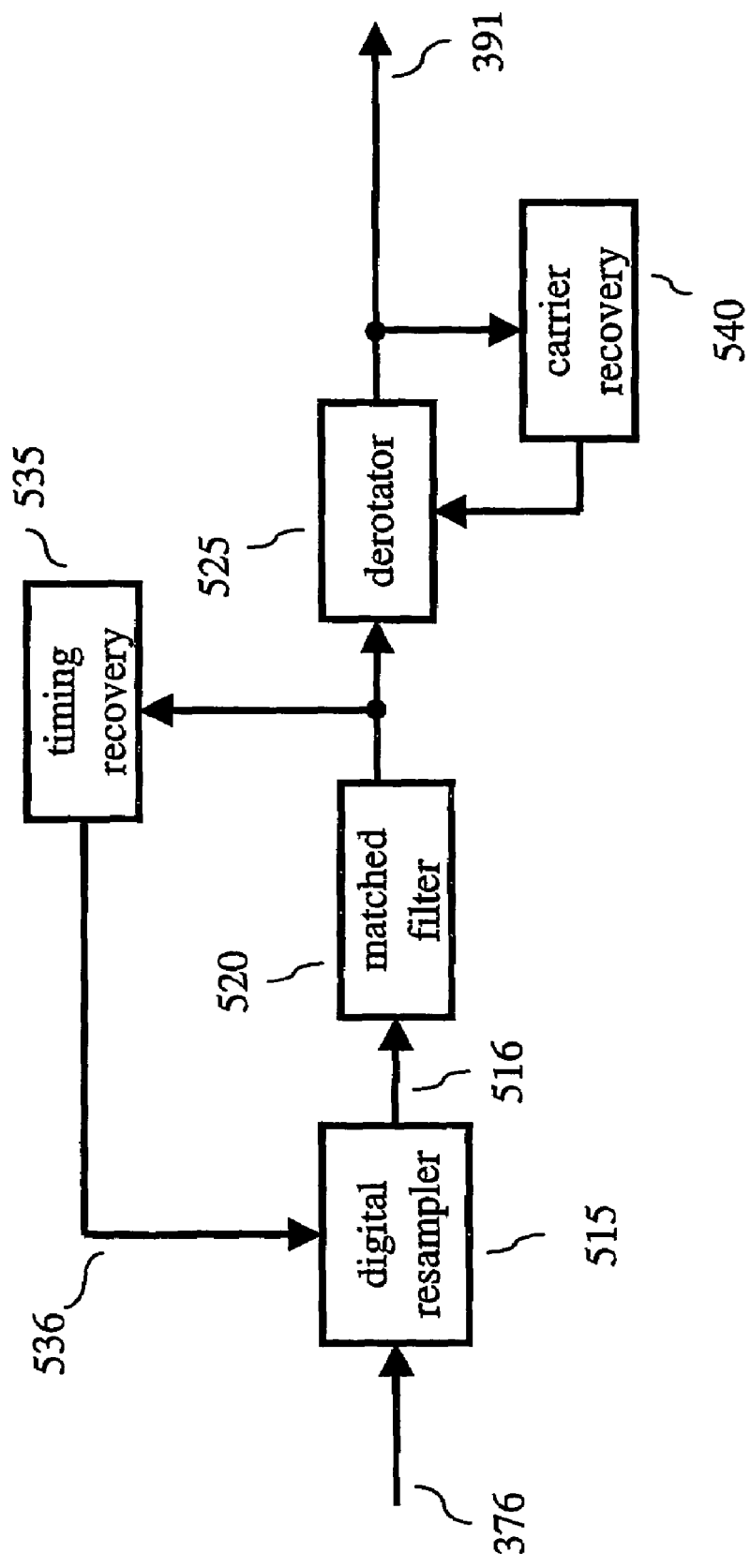

Returning again to FIG. 10, LL modulated signal 376 is then applied to LL demodulator 390, which recovers therefrom a demodulated LL signal as represented by demodulated LL signal point stream 391. An illustrative block diagram of LL demodulator 390 is shown in FIG. 14. LL demodulator 390 includes digital resampler 515, matched filter 520, timing recovery element 535, derotator 525, and carrier recovery element 540. LL modulated signal 376 is applied to digital resampler 515, which resamples LL modulated signal 376 using LL timing signal 536 to bring the LL signal to the initial LL processing rate, which is typically an integer multiple of the lower layer symbol rate. Digital resampler 515 works in conjunction with timing recovery element 535. Resampled LL modulated signal 516 is applied to matched filter 520, which is a band-pass filter for filtering and shaping resampled LL modulated signal 516 about the LL carrier frequency to provide a filtered signal to both derotator 525 and the abovementioned timing recovery element 535, which generates therefrom LL timing signal 536. Derotator 525 derotates, i.e., removes the carrier from the filtered signal to provide a demodulated LL signal point stream 391, which is also applied to carrier recover element 540. The latter uses the demodulated LL signal point stream 391 to provide a recovered LL carrier signal to derotator 525.

Returning once again to FIG. 10, H-L mux 395 receives demodulated UL signal point stream 333 and demodulated LL signal point stream 391. In accordance with the principles of the invention, H-L mux 395 selects either UL signal point stream 333 or LL signal point stream 391 for processing and subsequent application to LL decoder 340 as a function of demodulation mode signal 389. If demodulation mode signal 389 indicates layered demodulation, then H-L mux 395 selects LL signal point stream 391 for processing. However, if demodulation select signal 389 indicates hierarchical demodulation, then H-L mux 395 selects UL signal point stream 333 for processing.

Figure 15:
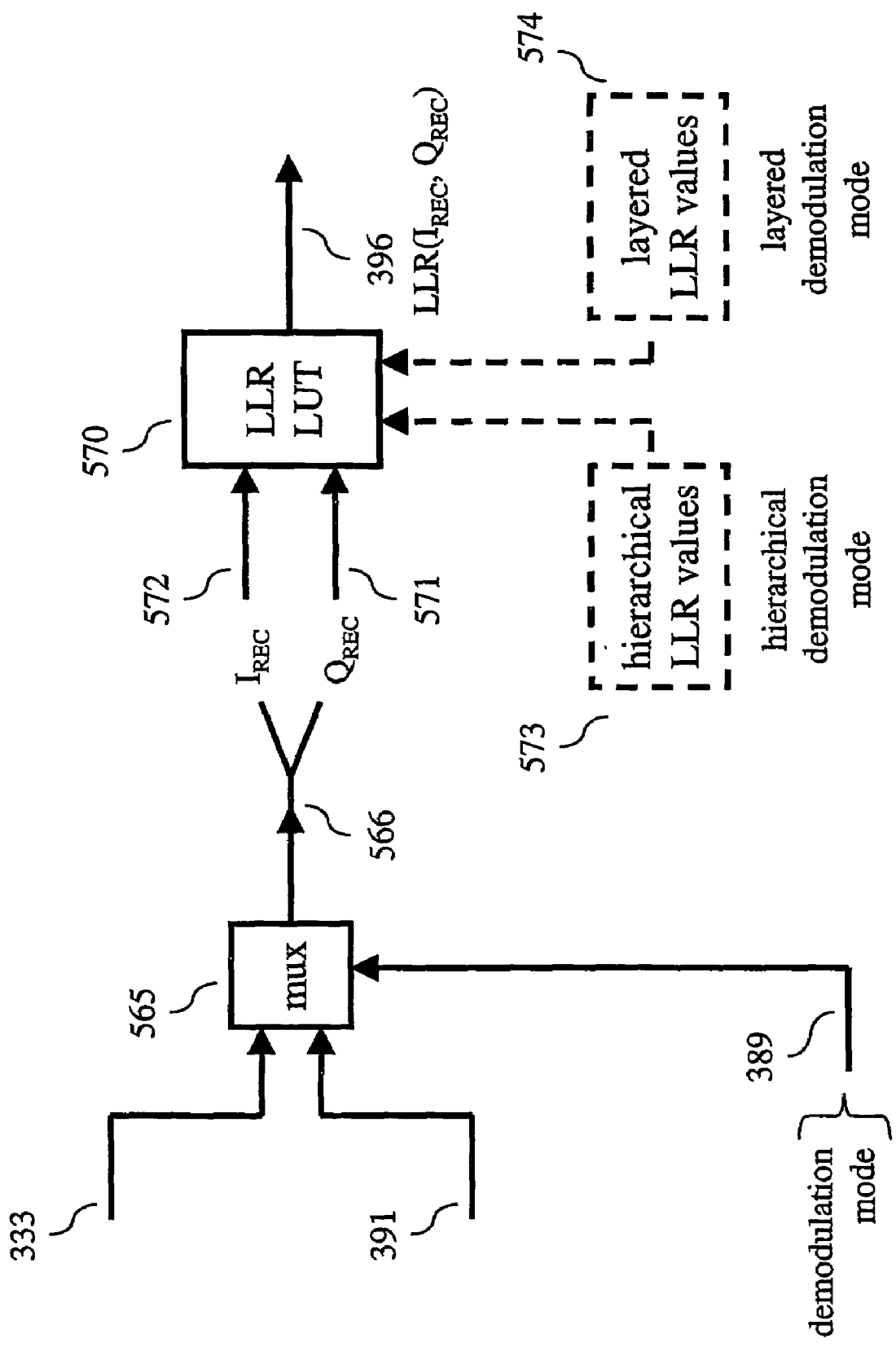

Attention should now be directed to FIG. 15, which shows an illustrative block diagram of H-L mux 395. The latter comprises multiplexer (mux) 565 and log-likelihood ratio (LLR) look-up table (LUT) 570. The input signals to H-L mux 395 are received signal point values (either from the UL or the LL) and the output signals of H-L mux 395 are soft values representing the probability that certain bits were received. In particular, Mux 565 selects either UL signal point stream 333 or LL signal point stream 391 as a function of demodulation mode signal 389, as described above, and provides the selected signal as received signal 566. As such, received signal 566 is a stream of received signal points, each received signal point having an in-phase ($I_{REC}$) component (572) and a quadrature ($Q_{REC}$) component (571) in a signal space. This is further illustrated in FIG. 16 for a received signal point $Z_{REC}$, where:

$$z = I_{rec} + j Q_{rec}. \quad (1)$$

Figure 17:
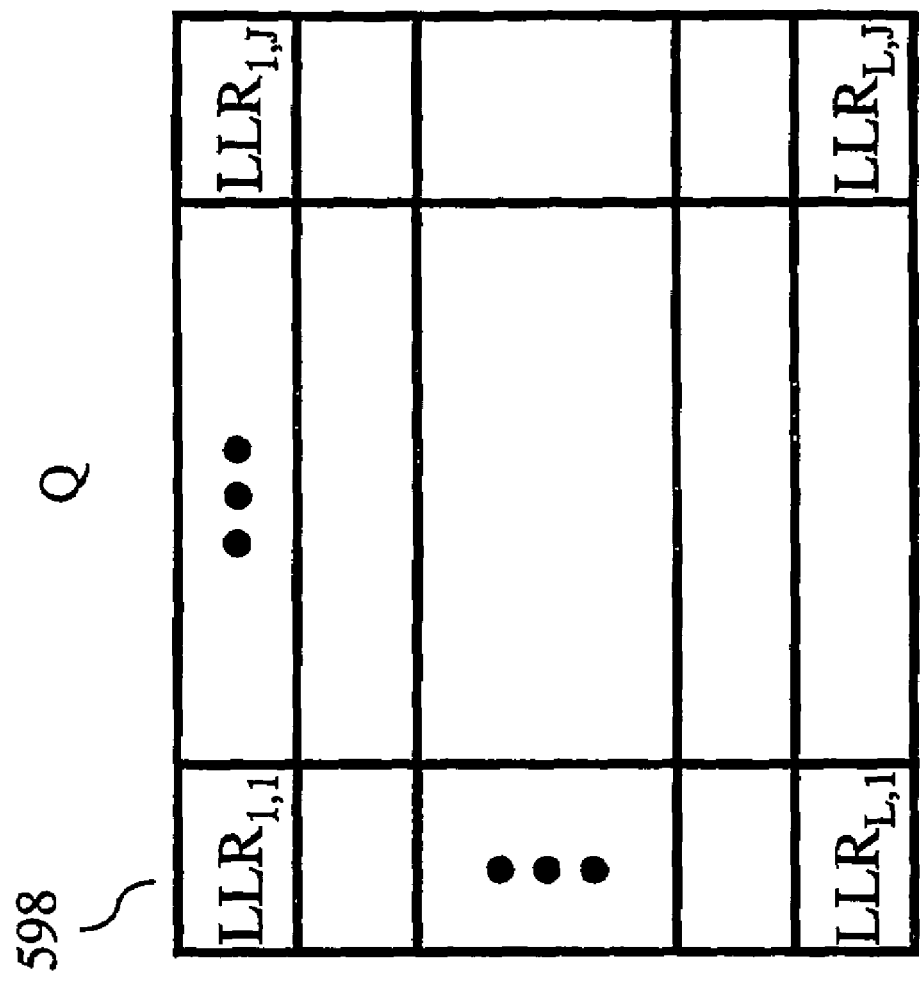
FIG. 17 shows an illustrative log-likelihood look-up table in accordance with the principles of the invention.

The $I_{REC}$ and $Q_{REC}$ components of each received signal point are applied to LLR LUT 570. The latter stores a LUT 599 of precomputed LLR values as illustrated in FIG. 17. In particular, each row of LUT 599 is associated with a particular I component value (an I row value), while each column of LUT 599 is associated with a particular Q component value (a Q column value). LUT 599 has L rows and J columns. LLR LUT 570 quantizes the IREC and QREC component values of a received signal point of received signal 566 to form an input address, which is used as an index into LUT 599 for selecting therefrom a respective precomputed LLR. Each lower-layer symbol interval, $T_{LL}$, the selected LLR is provided via signal 396 to LL decoder 340. For example, if the $I_{REC}$ component value of signal 566 is quantized to the first row and the $Q_{REC}$ component value of signal 566 is quantized to the first column, then LLR 598 would be selected and provided via signal 396 of FIG. 15 to LL decoder 340 of FIG. 10.

Other than the inventive concept, and as known in the art, for a given bit-to-symbol mapping $M(b_i)$, where M are the target symbols and bi=0, 1, ... B−1, are the bits to be mapped where B is the number of bits in each symbol (e.g., B may be two bits for QPSK, three bits for 8-PSK, etc.), the log-likelihood ratio function for the ith bit of a B bit value is:

$$LLR(i, z) = \log\,[(prob(b_i=1|z))/(prob(b_i=0|z))]; \quad (2)$$

where $b_i$ is the ith bit and z is the received signal point in the signal space. The notation "prob ($b_i=1|z$)" represents the probability that the ith bit is a "1" given that the signal point z was received. Similarly, the notation "prob (b$_i$=0|z)" represents the probability that the ith bit is a "0" given that the signal point z was received.

For a two-dimensional signal space, the probabilities within equation (2) are assumed to be based upon additive Gaussian white noise (AWGN) having a probability density function (PDF) of:

$$prob(n) = \frac{\exp\left(\frac{-|n|^2}{2\sigma^2}\right)}{2\pi\sigma^2}. \quad (3)$$

Therefore, the LLR for a given bit and received signal point are defined as:

$$LLR(i, z) = \log\left[\frac{\sum_{M_{bh\,i=1}} \exp\left(\frac{-|z-M|^2}{2\sigma^2}\right)}{\sum_{M_{bh\,i=0}} \exp\left(\frac{-|z-M|^2}{2\sigma^2}\right)}\right]. \quad (4)$$

It can be observed from equation (4) that the LLR for a given received signal point z is a function of z, the target symbols M, and the rms noise level σ. An LLR is also one example of a "soft metric."

Figure 18:
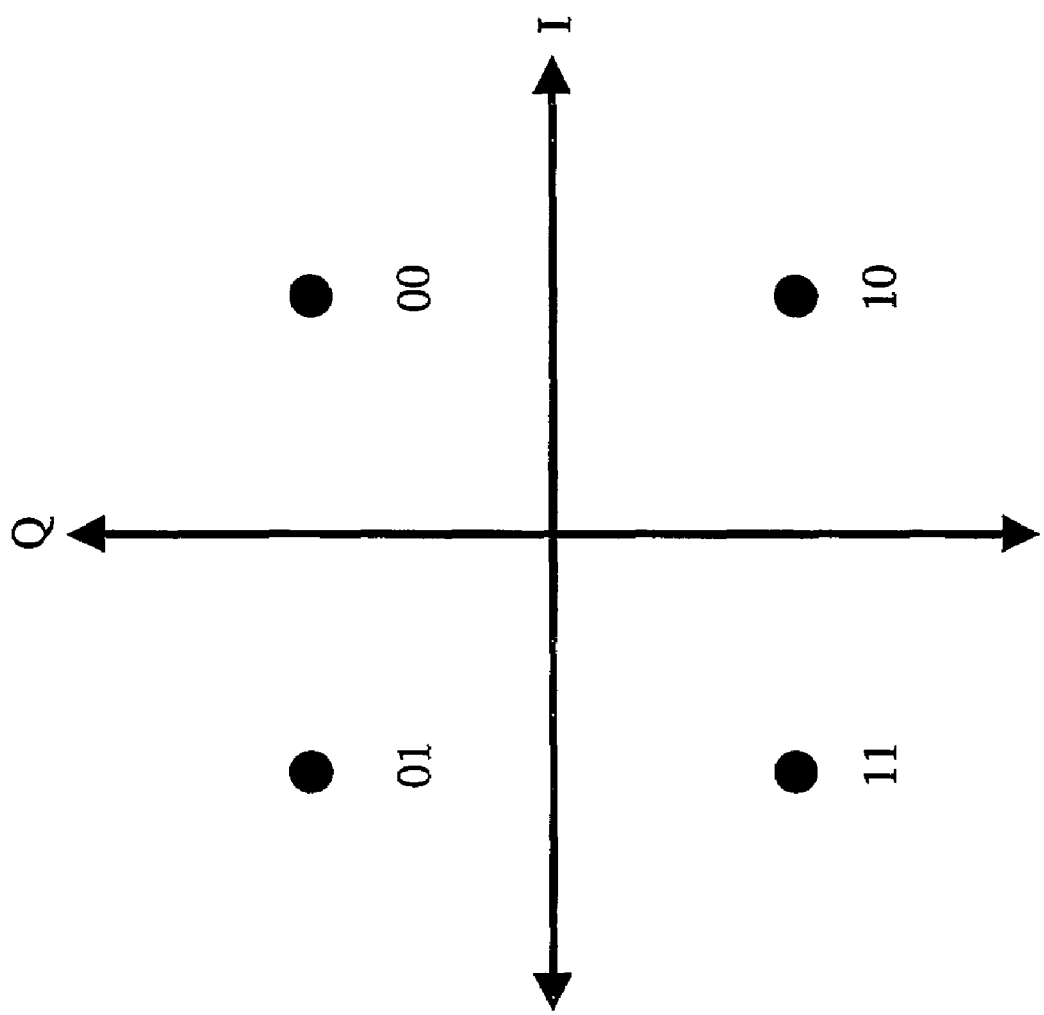
FIG. 18 shows an illustrative symbol constellation.
Figure 19:
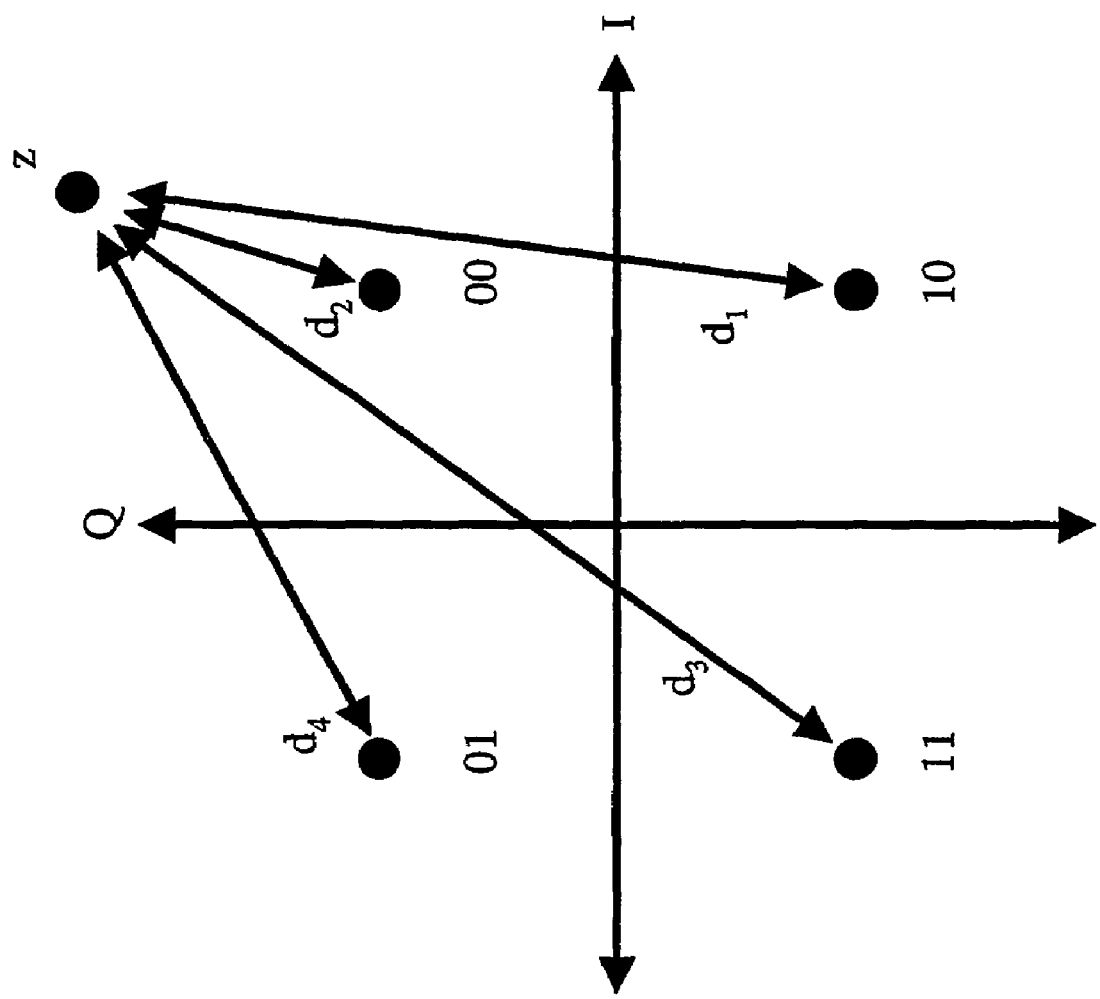
FIGS. 19 and 20 illustrate log-likelihood calculations.

A pictorial illustration of the calculation of an LLR ratio is shown in FIGS. 18 and 19. FIG. 18 shows an illustrative LL symbol constellation. For simplicity a 4 symbol QPSK (quadrature phase shift keyed) constellation is shown, however, it should be noted that other sizes and shapes of symbol constellations could also have been used, e.g., 3 bits for 8-PSK, 4 bits for 16-QAM, a hierarchical 16-QAM, etc. As can be observed from FIG. 18, there are four symbols in the signal space 89, each symbol associated with a particular two bit mapping [b1, b0]. Turning now to FIG. 19, a received signal point z is shown in relation to the symbols of signal space 89. It can be observed from FIG. 19 that the received signal point z is located at different distances $d_i$ from each of the symbols of signal space 89. For example, the received signal point z is located a distance $d_4$ from the symbol associated with the two bit mapping "01." As such, the LLR(b0) is:

ln[(probability b0 is one)/(probability b0 is zero)]; or  (5A)

ln[(probability (symbol 01 or 11))/(probability (symbol 00 or 10))]; or  (5B)

ln[{exp(-d$_4^2$/(2σ$^2$))+exp(-d$_3^2$/(2σ$^2$))}/{exp(-d$_2^2$/(2σ$^2$))+exp(-d$_1^2$/(2σ$^2$))}].  (5C)

while the LLR(b1) is:

ln[(probability b1 is one)/(probability b1 is zero)]; or  (6A)

ln[(probability (symbol 10 or 11))/(probability (symbol 00 or 01))]; or  (6B)

ln[{exp(-d$_1^2$/(2σ$^2$))+exp(-d$_3^2$/(2σ$^2$))}/{exp(-d$_2^2$/(2σ$^2$))+exp(-d$_4^2$/(2σ$^2$))}].  (6C)

Figure 20:
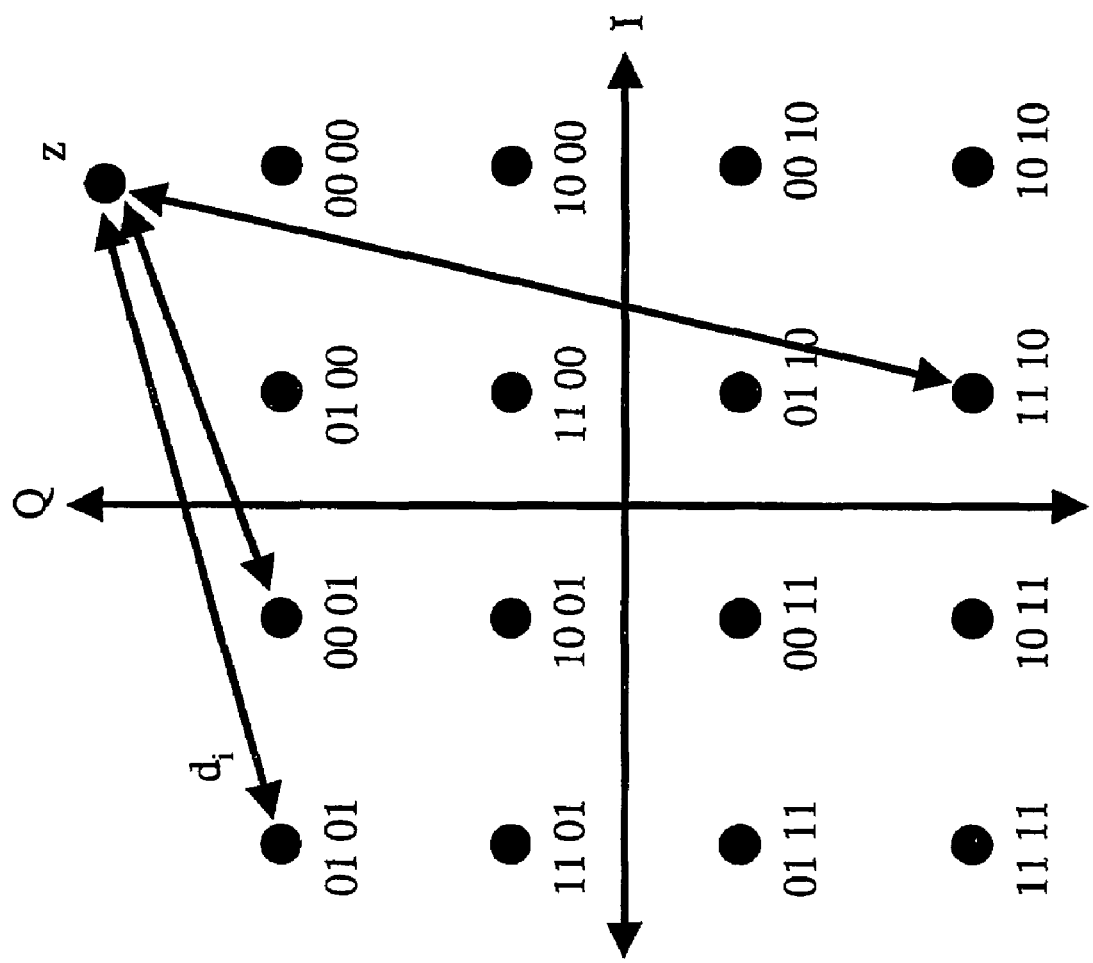

Returning to FIG. 15, it can be observed that LLR LUT 570 (i.e., LUT 599) is initialized to either a set of hierarchical LLR values 573 or layered LLR values 574 depending on the respective mode of receiver 30. For example, the layered LLR values are calculated a priori with respect to a LL symbol constellation such as illustrated in FIGS. 4, 18 and 19; while the hierarchical LLR values are calculated a priori with respect to the combined symbol constellation such as the one illustrated in FIG. 5 and shown again in FIG. 20. In other words, the hierarchical LLRs for the LL are determined—not with respect to the LL signal space (e.g., signal space 89 of FIG. 4)—but with respect to the combined signal space (e.g., signal space 79 of FIG. 5). For every received signal point z, a distance between each symbol of signal space 79 and the received signal point z is determined and used in calculating an LLR. For simplicity, only some of these distances, $d_i$, are shown in FIG. 20. The hierarchical LLR values 573 and the layered LLR values 574 can be formed in any number of ways. For example, receiver 30 may perform the calculations by using, e.g., a training signal, provided by transmitter 5 either during start-up, or re-initialization, of communications between the two endpoints (transmitter 5 and receiver 30). As known in the art, a training signal is a predefined signal, e.g., a predefined symbol sequence that is known a priori to the receiver. A predefined "handshaking" sequence may further be defined, where the endpoints exchange signaling before communicating data therebetween. Alternatively, the calculations may be performed remotely, e.g., at the location of transmitter 5 and sent to receiver 30 via an in-band or out-of-band signaling channel (this could even be via a dial-up facility (wired and/or wireless) (not shown)). Alternatively, the calculations can be performed analytically and the hierarchical LLR values 573 or layered values 574 preprogrammed into a memory at the time of manufacture of the receiver.

Referring back to FIG. 10, LL decoder 340 receives the sequence of LLRs (the soft input data), via signal 396, and provides therefrom LL signal 321-2. LL decoder 340 operates in a complementary fashion to that of LL encoder 110. It should also be noted that LL decoder 340 may also be a soft-input-soft-output decoder, and provide soft output values, which are then additionally processed (not shown) to form LL signal 321-2.

Thus, in a layered demodulation mode, and as can be observed from FIG. 10, receiver 30 sequentially demodulates the received signal by first recovering the UL signal via UL demodulator 330 and decoder 335. The recovered UL signal is then reencoded and remodulated for subtraction from the received signal to uncover the LL signal for demodulation by LL demodulator 390. The resulting demodulated LL signal point stream 391 is then processed to generate soft input data, e.g., LLRs, with respect to the LL symbol constellation. In contrast, in a hierarchical demodulation mode, the UL signal point stream 333 is recovered, from which the LL signal is then directly determined. This is referred to herein as a simultaneous mode of decoding. In particular, the UL signal point stream 333 is processed to generate soft input data, e.g., LLRs, to recover therefrom the LL data.

Figure 21:
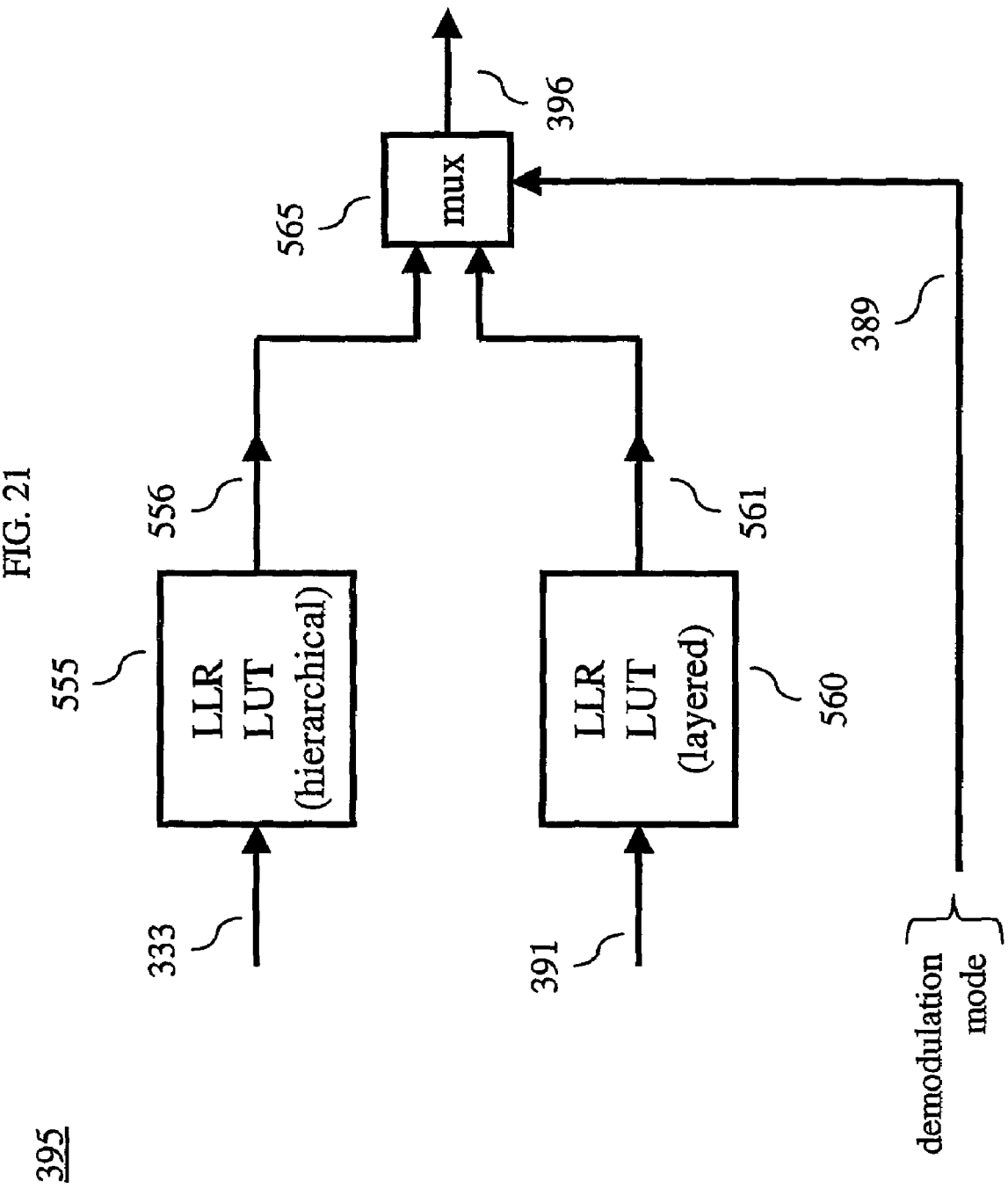
FIG. 21 shows another variation of H-L mux 395 of FIG. 10.

Other variations of H-L mux 395 are possible. For example, FIG. 21 shows an illustration where two separate look-up tables (555 and 560) are located in front of mux 565, which selects the appropriate signal (either signal 556 or 561) in accordance with demodulation mode signal 389.

Figure 22:
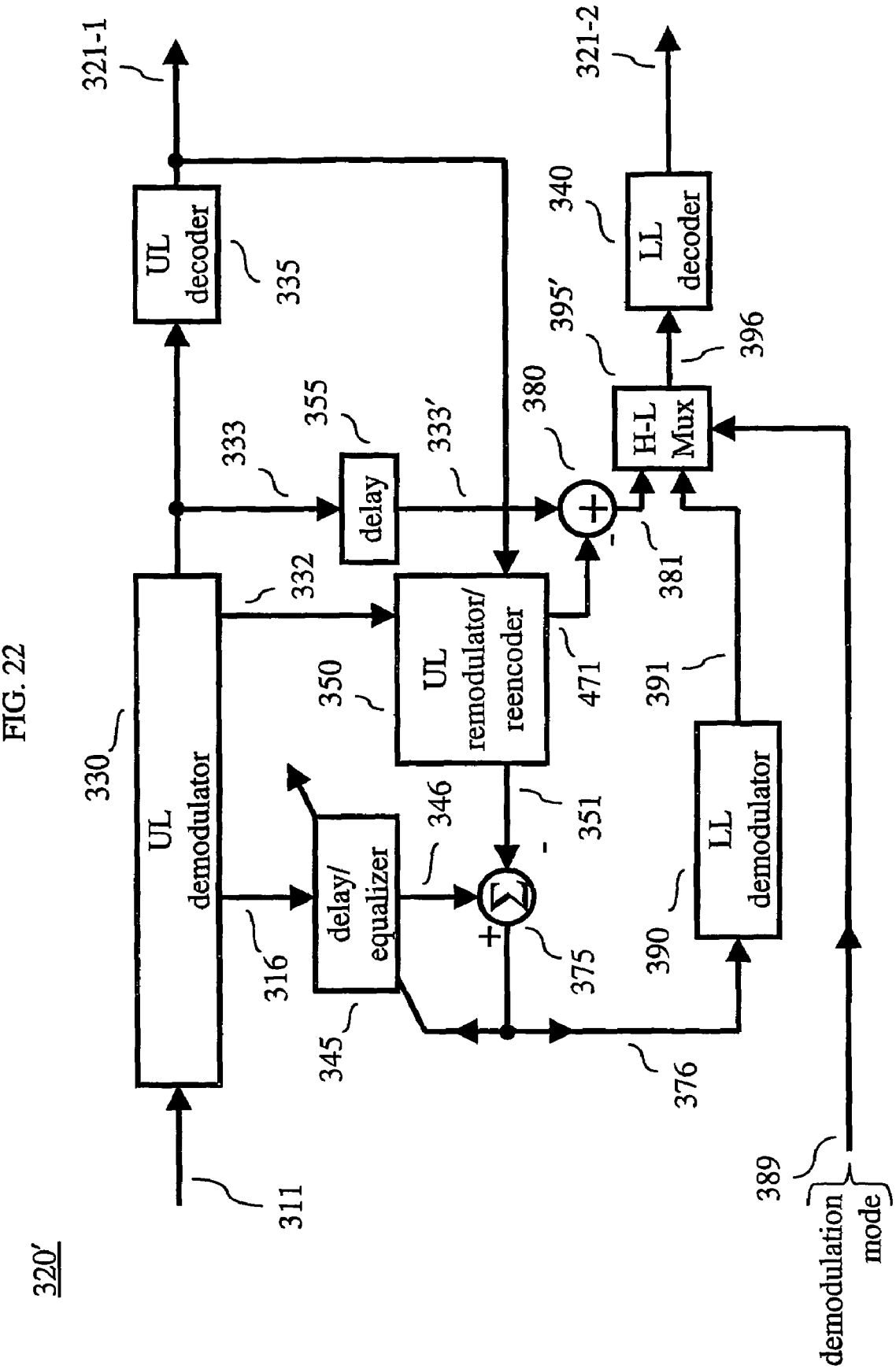
FIGS. 22-23 show other illustrative embodiments of a unified demodulator/decoder in accordance with the principles of the invention.

Another embodiment in accordance with the principles of the invention is shown in FIG. 22. Illustratively, in this embodiment a unified demodulator/decoder 320' sequentially decodes the received signal when in the hierarchical mode of operation. For sequential decoding of a hierarchical modulation based signal, the receiver first decodes the UL signal and then decodes the LL signal. As can be observed from FIG. 22, unified demodulator/decoder 320' is similar to unified demodulator/decoder 320 of FIG. 10 except for the addition of combiner, or adder 380, delay element 355 and H-L mux 395'. Delay element 355 compensates for the processing delay of UL decoder 335, encoder 470, etc. Illustratively, adder 380 receives as input signals the delayed demodulated UL signal point stream 333' and symbol stream 471, which is available from UL remodulator/reencoder 350 as shown in FIG. 12. Combiner 380 subtracts the encoded symbol stream 471 from delayed demodulated UL signal point stream 333' to provide an LL signal point stream 381 to an input of H-L mux 395'. As before, H-L mux 395' selects the applied signals, here, either LL signal point stream 381 or the demodulated LL signal point stream 391 as a function of the selected demodulation mode.

Figure 23:
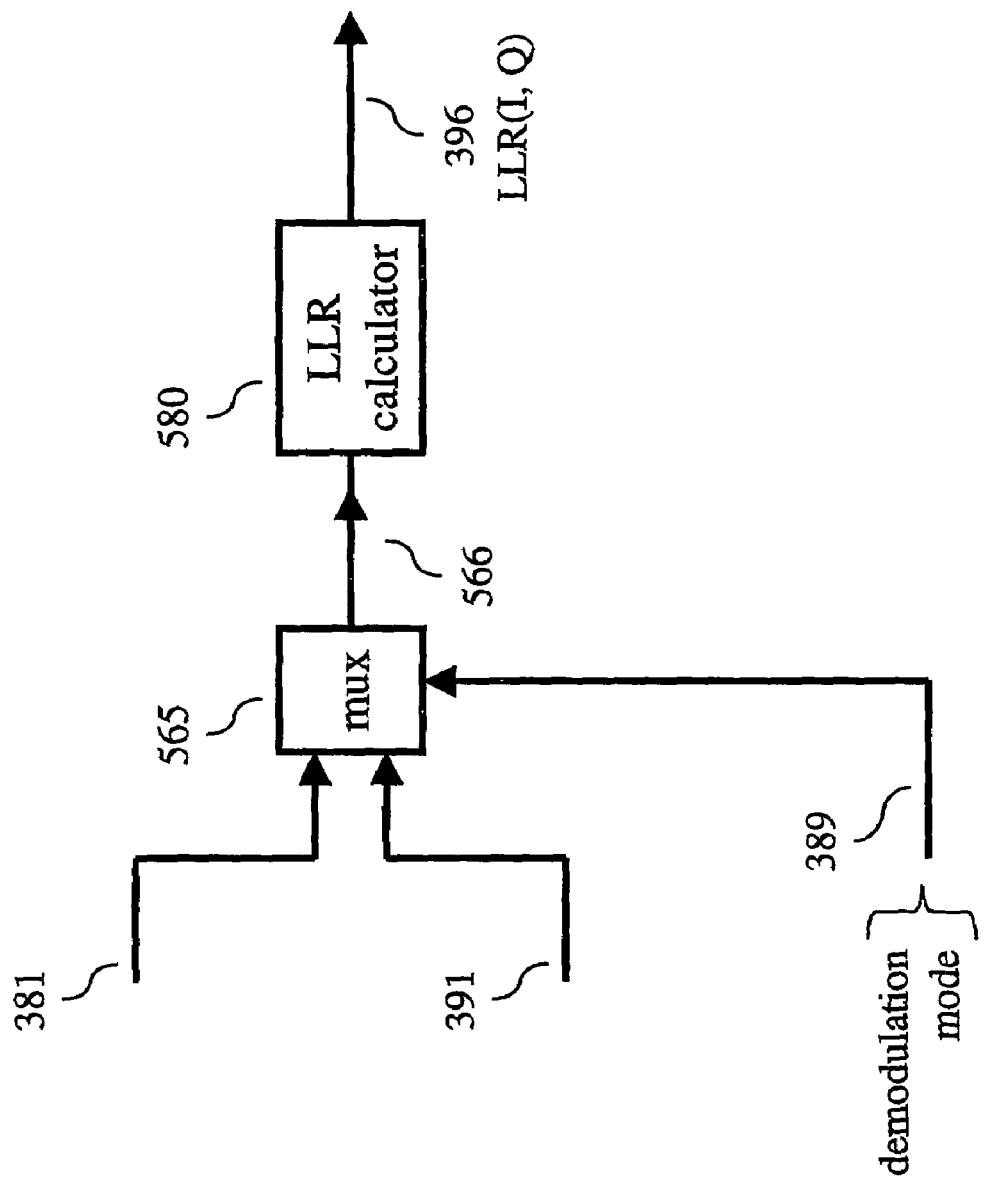

A block diagram of H-L mux 395' is shown in FIG. 23. In this example, H-L mux 395' includes mux 565 and LLR calculator 580. Mux 565 selects between LL signal point stream 381 or the demodulated LL signal point stream 391 as a function of demodulation mode signal 389 to provide received signal point stream 566. The latter is applied to a soft data generator, such as represented by LLR calculator 580, which provides LLR data 396 to LL decoder 340, as described above.

Figure 24:
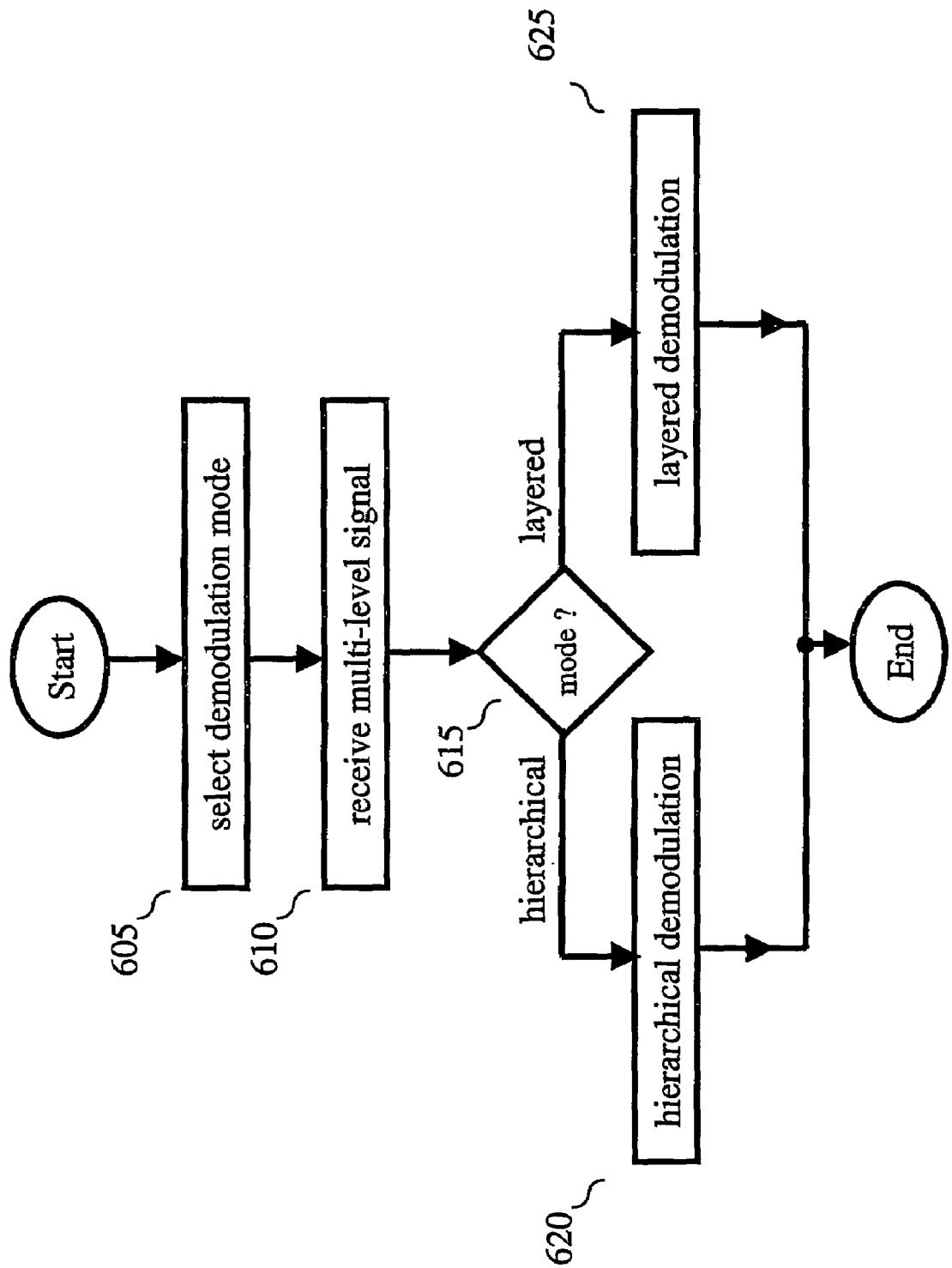
FIG. 24 shows an illustrative flow chart in accordance with the principles of the invention.

Attention should now be directed to FIG. 24, which shows an illustrative flow chart in accordance with the principles of the invention of a process for use in receiver 30 of FIG. 1. In step 605, receiver 30 selects a one of a number of demodulation modes. Illustratively, there are at least two demodulation modes: hierarchical demodulation and layered demodulation. As noted above, this selection can be performed by, e.g., a jumper setting, a configuration screen (not shown) of receiver 30, or from data transmitted on an out-of-band or an in-band signaling channel. In step 610, receiver 30 receives a multi-level signal. In step 615, receiver 30 determines the demodulation process to perform as a function of the selected demodulation mode. If the demodulation mode is hierarchical, then receiver 30 performs hierarchical demodulation of the received multi-level signal in step 620. On the other hand, if the mode of demodulation is layered, then receiver 30 performs layered demodulation of the received multi-level signal in step 625. It should be noted that selection of the demodulation mode (step 605) may be performed after receiving the multi-level signal (step 610).

Figure 16:
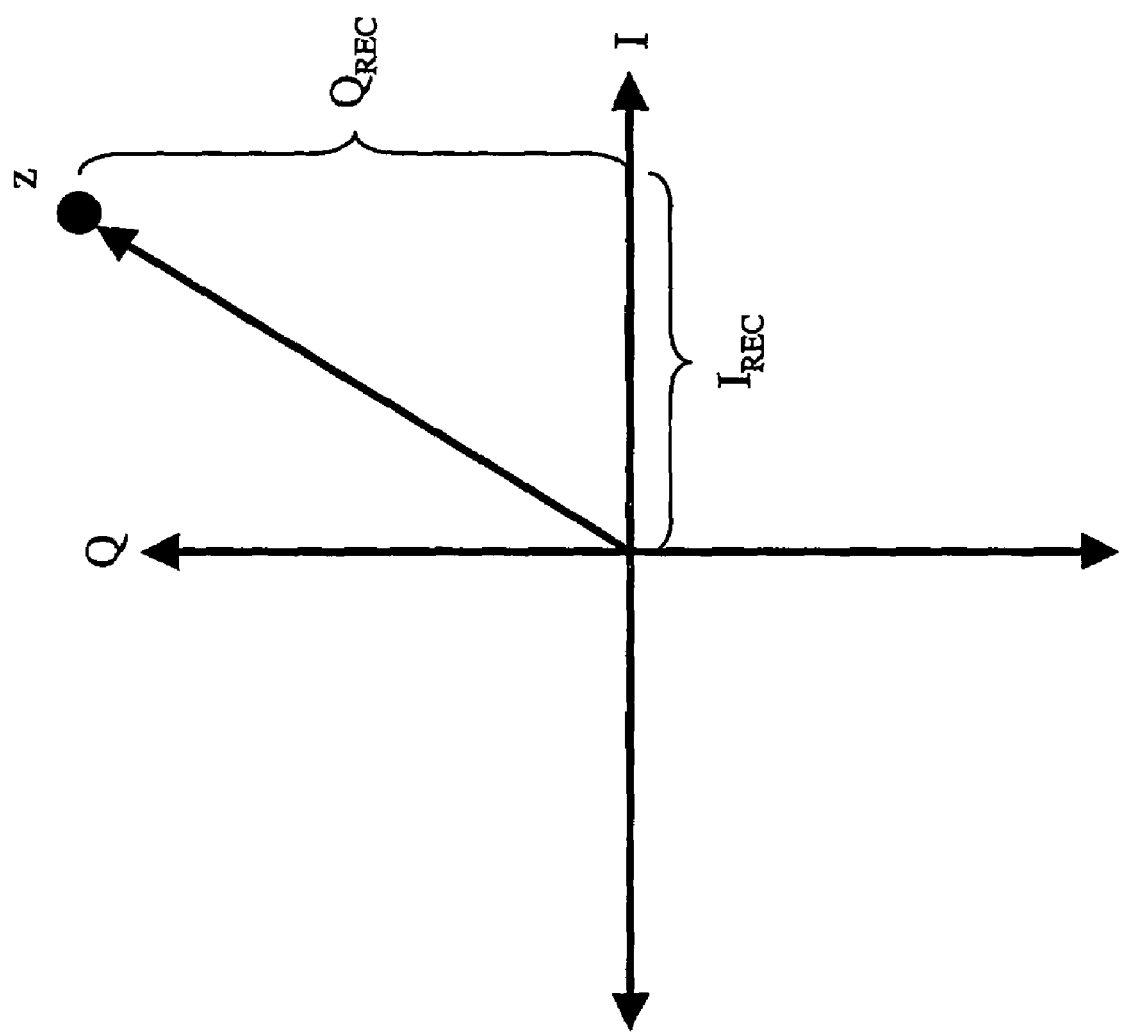
FIG. 16 shows an illustrative signal space.
Figure 25:
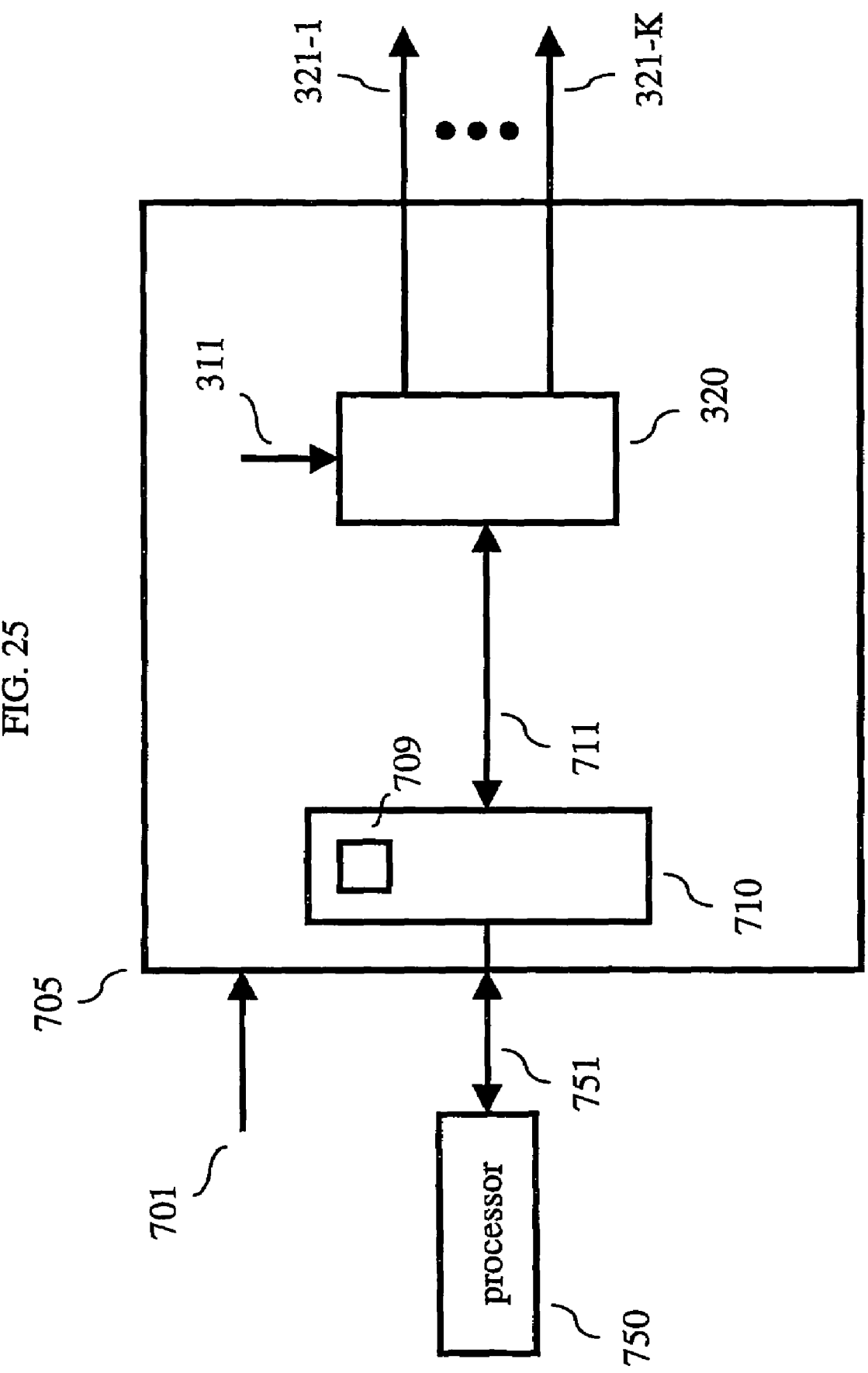
FIG. 25 shows another illustrative embodiment in accordance with the principles of the invention.

Another illustrative embodiment of the inventive concept is shown in FIG. 25. However, only those portions relevant to the inventive concept are shown. For example, analog-digital converters, filters, decoders, etc., are not shown for simplicity. In this illustrative embodiment an integrated circuit (IC) 705 for use in a receiver (not shown) includes unified demodulator/decoder 320 and at least one register 710, which is coupled to bus 751. The latter provides communication to, and from, other components of the receiver as represented by processor 750. Register 710 is representative of one, or more, registers of IC 705, where each register comprises one, or more, bits as represented by bit 709. The registers, or portions thereof, of IC 705 may be read-only, write-only or read/write. In accordance with the principles of the invention, unified demodulator/decoder 320 decodes a received multi-level modulated signal and at least one bit, e.g., bit 709 of register 710, is a programmable bit that can be set by, e.g., processor 750, for controlling the operation of unified demodulator/decoder 320. In the context of FIG. 16, IC 705 receives an IF signal 701 for processing via an input pin, or lead, of IC 705. A derivative of this signal, 311, is applied to unified demodulator/decoder 320. The latter provides output signals 321-1 through 321-K as described above. Unified demodulator/decoder 320 is coupled to register 710 via internal bus 711, which is representative of other signal paths and/or components of IC 705 for interfacing unified demodulator/decoder 320 to register 710 as known in the art.

As described above, and in accordance with the inventive concept, a receiver handles both hierarchical modulation and layered modulation in a unified framework. Although only two demodulation modes were described herein, the inventive concept is not so limited and, as such, a receiver in accordance with the principles of the invention may have more than two demodulation modes. It should be noted that although the inventive concept was described in the context of LL decoder 340 receiving soft metrics, LL decoder 340 may receive signal points and, as such, further process the received signal point data to derive therefrom LLRs as described above. In this context, the above-described H-L mux element is simply a multiplexer for selecting the received signal point stream such as mux 565 of FIG. 23. It should also be noted that although described in the context of a receiver coupled to a display as represented by TV 35, the inventive concept is not so limited. For example, receiver 30 may be located further upstream in a distribution system, e.g., at a head-end, which then retransmits the content to other nodes and/or receivers of a network. Further, although hierarchical modulation and layered modulation were described in the context of providing communication systems that are backward compatible, this is not a requirement of the inventive concept. It should also be noted that groupings of components for particular elements described and shown herein are merely illustrative. For example, either or both UL decoder 335 and LL decoder 340 may be external to element 320, which then is essentially a demodulator that provides at least a demodulated upper layer signal and a demodulated lower layer signal.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor (DSP) or microprocessor that executes associated software, e.g., corresponding to one or more of the steps shown in FIG. 24. Further, although shown as separate elements, the elements therein may be distributed in different units in any combination thereof. For example, receiver 30 may be a part of TV 35. It is therefore to be understood that numerous modifications may be made to the illustrative embodiments and that other arrangements may be devised without departing from the spirit and scope of the present invention as defined by the appended claims.

The invention claimed is:

1. A receiver comprising:
a down convener for providing a received signal; and
a demodulator having at least two demodulation modes for demodulating the received signal, wherein one demodulation mode is hierarchical demodulation and another demodulation mode is layered demodulation, and wherein the demodulator comprises
an upper layer demodulator for processing the received signal to provide a demodulated upper layer signal;
an upper layer decoder for decoding the demodulated upper layer signal to provide a decoded upper layer signal;

an upper layer remodulator/reencoder responsive to the decoded upper layer signal for providing a reconstructed modulated upper layer signal;

a combiner for combining the received signal with the reconstructed modulated upper layer signal such that an upper layer signal component of the received signal is substantially reduced therefrom to provide a received lower layer signal;

a lower layer demodulator for processing the received lower layer signal to provide a demodulated lower layer signal;

a selector for providing a lower layer signal derived from either the demodulated lower layer signal or the demodulated upper layer signal; and a lower layer decoder for decoding the lower layer signal to provide a decoded lower layer signal.

2. The receiver of claim 1, wherein the demodulator is responsive to a demodulation mode signal that specifies which one of the number of demodulation modes is performed by the demodulator.

3. The receiver of claim 1, wherein the selector is responsive to a demodulation mode signal for selecting either the demodulated lower layer signal or the demodulated upper layer signal for use in deriving the lower layer signal.

4. The receiver of claim 3, wherein the selector is responsive to the demodulation mode signal for selecting one of a number of log-likelihood ratio (LLR) look-up tables for use in deriving the lower layer signal.

5. The receiver of claim 1, further including an equalizer deposed between the received signal and the combiner for equalizing the received signal.

6. A receiver comprising:

a down converter for providing a received signal; and a demodulator having at least two demodulation modes for demodulating the received signal, wherein one demodulation mode is hierarchical demodulation and another demodulation mode is layered demodulation, wherein the demodulator comprises:

an upper layer demodulator for processing the received signal to provide a demodulated upper layer signal;

an upper layer decoder for decoding the demodulated upper layer signal to provide a decoded upper layer signal;

an upper layer remodulator/reencoder responsive to the decoded upper layer signal for providing a reconstructed modulated upper layer signal and a reconstructed encoded upper layer signal;

a combiner for combining the received signal with the reconstructed modulated upper layer signal such that an upper layer signal component of the received signal is substantially reduced therefrom to provide a received lower layer signal;

a combiner for combining the demodulated upper layer signal and the reconstructed encoded upper layer signal such that an upper layer symbol component of the demodulated upper layer signal is substantially reduced to provide a first demodulated lower layer signal;

a lower layer demodulator for processing the received lower layer signal to provide a second demodulated lower layer signal;

a selector for providing a lower layer signal derived from either the first demodulated lower layer signal or the second demodulated lower layer signal; and a lower layer decoder for decoding the lower layer signal to provide a decoded lower layer signal.

7. The receiver of claim 6, wherein the selector is responsive to a demodulation mode signal for selecting either the demodulated lower layer signal or the demodulated upper layer signal for use in deriving the lower layer signal.

8. The receiver of claim 7, wherein the selector further includes a soft input generator for convening the selected signal into soft input data, which is then provided as the lower layer signal.

9. The receiver of claim 8, wherein the soft input generator is a log-likelihood ratio generator.

10. The receiver of claim 6, further including an equalizer deposed between the received signal and the combiner for combining the received signal, for equalizing the received signal.

11. A method for use in a receiver, the method comprising:

receiving a signal;

selecting one of a number of demodulation modes, wherein at least two of the number of demodulation modes are a hierarchical demodulation mode and a layered demodulation mode; and demodulating by a demodulator the received signal in accordance with the selected demodulation mode;

wherein the demodulating step includes the steps of:

demodulating the received signal to provide a demodulated upper layer signal and a demodulated lower layer signal;

decoding the demodulated upper layer signal to provide a decoded upper layer signal;

selecting, as a function of the selected demodulation mode, either the demodulated lower layer signal or the demodulated upper layer signal for providing a lower layer signal, wherein the demodulated lower layer signal is selected when the demodulation mode is the layered demodulation mode and the demodulated upper layer signal is selected when the demodulation mode is the hierarchical demodulation mode; and decoding the lower layer signal to provide a decoded lower layer signal.

12. The method of claim 11, wherein the selecting step includes the steps of:

selecting a log-likelihood ratio (LLR) look-up table (LUT) as a function of the demodulation mode signal; and generating log-likelihood ratios from the LLR LUT as a function of the selected signal to provide the lower layer signal.

13. A method for use in a receiver, the method comprising:

receiving a signal;

selecting one of a number of demodulation modes, wherein at least two of the number of demodulation modes are a hierarchical demodulation mode and a layered demodulation mode; and demodulating by a demodulator the received signal in accordance with the selected demodulation mode;

wherein the demodulating step includes the steps of:

demodulating the received signal to provide a demodulated upper layer signal and a demodulated lower layer signal;

decoding the demodulated upper layer signal to provide a decoded upper layer signal;

reencoding the decoded upper layer signal to provide a reencoded upper layer signal;

subtracting the reencoded upper layer signal from the demodulated upper layer signal to provide an encoded lower layer signal;

selecting, as a function of the selected demodulation mode, either the demodulated lower layer signal or the encoded lower layer signal for providing a lower layer signal, wherein the demodulated lower layer signal is selected when the demodulation mode is the layered demodulation mode and the encoded lower layer signal is selected when the demodulation mode is the hierarchical demodulation mode; and decoding the lower layer signal to provide a decoded lower layer signal.

14. The method of claim 13, wherein the selecting step includes the step of generating log-likelihood ratios from the selected signal for providing the lower layer signal.

* * * * *